United States Patent
Hosokawa

(10) Patent No.: US 7,805,451 B2
(45) Date of Patent: Sep. 28, 2010

(54) ONTOLOGY-INTEGRATION-POSITION SPECIFYING APPARATUS, ONTOLOGY-INTEGRATION SUPPORTING METHOD, AND COMPUTER PROGRAM PRODUCT

(75) Inventor: Akira Hosokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 399 days.

(21) Appl. No.: 11/896,311

(22) Filed: Aug. 30, 2007

(65) Prior Publication Data

US 2008/0082574 A1  Apr. 3, 2008

(30) Foreign Application Priority Data

Sep. 28, 2006  (JP) ............... 2006-264837

(51) Int. Cl.
*G06F 17/30* (2006.01)
*G06F 17/00* (2006.01)

(52) U.S. Cl. ........................ 707/755; 706/55
(58) Field of Classification Search ............ None
See application file for complete search history.

(56) References Cited

U.S. PATENT DOCUMENTS

| 6,957,214 | B2 * | 10/2005 | Silberberg et al. ............ 707/4 |
| 7,093,200 | B2 * | 8/2006 | Schreiber et al. ............ 715/835 |
| 7,146,399 | B2 * | 12/2006 | Fox et al. .................... 709/203 |
| 7,516,229 | B2 * | 4/2009 | Trastour et al. ............. 709/230 |
| 2002/0023091 | A1 * | 2/2002 | Silberberg et al. ....... 707/103 Y |
| 2003/0177481 | A1 * | 9/2003 | Amaru et al. ............... 717/148 |
| 2003/0179228 | A1 * | 9/2003 | Schreiber et al. ............ 345/738 |
| 2004/0139095 | A1 * | 7/2004 | Trastour et al. ............ 707/100 |
| 2005/0216500 | A1 * | 9/2005 | Edelstein et al. ............ 707/102 |
| 2006/0156253 | A1 * | 7/2006 | Schreiber et al. ............ 715/835 |
| 2006/0248045 | A1 * | 11/2006 | Toledano et al. ............... 707/2 |
| 2009/0077051 | A1 * | 3/2009 | Edelstein et al. ............... 707/4 |

FOREIGN PATENT DOCUMENTS

| JP | 2001-014166 | 1/2001 |
| WO | 2006/020343 | 2/2006 |
| WO | 2006/028872 | 3/2006 |

OTHER PUBLICATIONS

Daniel J. Buehrer et al.; "Using a Class Algebra Ontology To Define Conversions between OWL/SQL/Java Beans"; The Computer Society; Proceedings of the IEEE/WIC/ACM International Conference on Web Intelligence (WI'04) 0-795-2100-02/04. (4 pages).
Extended Search Report in Application No. 07017088.1-1527, dated Dec. 19, 2007.

* cited by examiner

*Primary Examiner*—Neveen Abel Jalil
*Assistant Examiner*—Tarek Chbouki
(74) *Attorney, Agent, or Firm*—Nixon & Vanderhye, PC

(57) ABSTRACT

Attribute mapping information is stored, in which a superclass of an associated class in an integration-source ontology already associated with an integration-destination ontology, an attribute of the superclass, and an integration destination attribute of a class in the integration destination are associated with each other. An integration target class in the integration source is specified to acquire an attribute of a superclass of the integration target class. An associated class having the shortest distance from the integration target class is specified, to specify an integration-destination-associated class associated with the specified associated class. An inheritance relation is followed from the integration-destination-associated class to specify a class having the integration destination attribute corresponding to the attribute in the mapping information as a position where the class associated with the integration target class is present.

8 Claims, 19 Drawing Sheets

| CLASS ID | PARENT CLASS ID | IMPORT-SOURCE CLASS ID | NAME |
|---|---|---|---|
| X1 | | | PRODUCT |
| X2 | X1 | | FOUR-WHEELED VEHICLE |
| X3 | X1 | | OTHER VEHICLES |
| X4 | X2 | | ELECTRIC VEHICLE |
| X5 | X2 | | GASOLINE-POWERED VEHICLE |
| X6 | | | TWO-WHEELED VEHICLE |
| X7 | X3 | | AMPHIBIAN VEHICLE |

FIG.5

| ATTRIBUTE ID | DEFINING CLASS ID | NAME |
|---|---|---|
| x1 | X1 | HEIGHT |
| x2 | X2 | NUMBER OF DOORS |
| x3 | X6 | HEIGHT OF SEAT |
| x4 | X7 | NUMBER OF TIRES |

FIG.6

| CLASS | x1 | x2 | x3 | x4 |
|---|---|---|---|---|
| X4 | 1.5 | 4 | | |
| X5 | 1.2 | 3 | | |
| X6 | 0.7 | | 0.6 | |
| X7 | 1.0 | | | 8 |

FIG.7

| CLASS ID OF INTEGRATION SOURCE | CLASS ID OF INTEGRATION DESTINATION |
|---|---|
| X5 | Y7 |
| X7 | Y4 |

| CLASS ID OF INTEGRATION SOURCE | ATTRIBUTE ID OF INTEGRATION SOURCE | ATTRIBUTE ID OF INTEGRATION DESTINATION |
|---|---|---|
| X1 | x1 | y4 |
| X1 | x1 | y2 |
| X2 | x1 | y2 |
| X2 | x2 | y3 |
| X3 | x1 | y1 |
| X5 | x1 | y2 |
| X5 | x2 | y3 |
| X7 | x1 | y1 |
| X7 | x4 | y4 |

GENERIC ←———————————→ SPECIFIC
GRANULARITY

ONTOLOGY-INTEGRATION-POSITION SPECIFYING APPARATUS, ONTOLOGY-INTEGRATION SUPPORTING METHOD, AND COMPUTER PROGRAM PRODUCT

CROSS-REFERENCE TO RELATED APPLICATIONS

This application is based upon and claims the benefit of priority from the prior Japanese Patent Application No. 2006-264837 filed on Sep. 28, 2006; the entire contents of which are incorporated herein by reference.

BACKGROUND OF THE INVENTION

1. Field of the Invention

The present invention relates to an ontology-integration-position specifying apparatus, an ontology-integration supporting method, and a computer program product that support association between classes included in an integration-source ontology and classes included in an integration-destination ontology.

2. Description of the Related Art

In recent years, the ontology in which knowledge or a concept is systematically classified and described has been used in many industries. In a general ontology, knowledge or a concept is expressed as a class hierarchy in which an attribute (property) of a superclass is inherited by a subclass. Superclass-subclass relationships are transitive. For example, when class A is a superclass of class B, and class B is a superclass of class C, class A is a superclass of class C. On the other way around, when class C is a subclass of class B, and class B is a subclass of class A, class C is a subclass of class A. Each class in the class hierarchy is associated with data (or a group of data pieces) which is described according to the attribute of the pertinent class. The associated data (or the group of data pieces) is called an "instance" of the class or the class hierarchy.

One distinguished characteristic of the class hierarchy is that the instances held by the subclasses can be viewed from the superclasses. This is because the subclass inherits the attribute of the superclass. Further, when the instance held by the subclass is viewed from the superclass, only values corresponding to the attributes held by the superclass can be viewed.

One technique that systematically represents vocabularies and knowledge present on a web and relations therebetween is the Web Ontology Language (OWL). The OWL, which is recommended by the World Wide Web Consortium (W3C), is designed to express a classification system of deducible vocabularies based on a collection of Subject, Predicate, and Object triplets of Resource Description Framework (RDF). An ontology is also used as a data model in various areas in industries, for example, in the PLIB (ISO 13584/Parts Library), which provides an international standard for industrial data.

When the concept and the instances thereof are managed by the ontology, a plurality of ontologies sometimes needs to be integrated. For example, when a merger of a companies or unification and reorganization of departments occurs, the ontologies managed in each company or each department need to be integrated and the instances need to be managed in an integrated manner.

In some cases, it may be desirable to reuse one of the existing ontologies, rather than constructing a brand-new ontology. When one existing ontology (hereinafter also referred to as integration-destination ontology) is to be reused, classes of the other existing ontology (hereinafter also referred to as integration-source ontology) may be added to the class hierarchy of the reused, existing ontology, or the existing class hierarchy may be expanded, so that the classes are properly allocated. Thus, the instances stored in the integration-source ontology can be integrated into the integration-destination ontology and managed by the integration-destination ontology.

As a technique for integrating the ontologies, various techniques have been proposed. For example, a technique described in JP-A 2001-14166 (KOKAI) is intended to compare and analyze attributes of classes of respective ontologies, find similarity between the classes, and associates the classes with each other when the classes that belong to different ontologies have a high degree of similarity. Such a technique facilitates the integration of ontologies by clarifying the correspondence between the classes in the ontologies.

The technique disclosed in JP-A 2001-14166 (KOKAI), however, does not take into consideration the granularity of the attributes held by the classes of the integration-source ontology and the integration-destination ontology. When the corresponding classes of the two ontologies have attributes with different granularities, the association of the classes and the attributes cannot be performed properly.

The granularity of the attribute is a measure of a scope encompassed by the attribute. For example, if a generic attribute "height" of the integration-source ontology is associated with a specific attribute such as "height in lying position" or "height in upright position" of the integration-destination ontology, there is a certain difference in the scopes encompassed by the respective attributes.

When the attribute of a class included in the integration-source ontology and the attribute of a class included in the integration-destination ontology are different in granularity, one attribute of one ontology comes to be associated with plural attributes of the other ontology. When two ontologies have many attributes with different granularities, a significantly large number of attributes of one ontology end up being associated with one attribute of the other ontology. When an attribute of one ontology can be associated with plural attributes of the other ontology, it is difficult to automatically choose one proper, corresponding attribute. Then, the automatic determination of a corresponding attribute is obstructed.

SUMMARY OF THE INVENTION

According to one aspect of the present invention, an ontology-integration-position specifying apparatus includes a class storage unit that stores class mapping information in which a class included in an integration-source ontology and a class included in an integration-destination ontology are associated with each other, at a time of integrating hierarchical ontologies in which an attribute held by a superclass is inherited by a subclass and an inheritance relation can be specified, an attribute storage unit that stores attribute mapping information in which a superclass of an associated class, which is a class in the integration-source ontology and associated in the class mapping information, an attribute held by the superclass of the associated class, and an integration destination attribute which is an attribute of a class in the integration-destination ontology and corresponding to the associated class are associated with each other, a class specifying unit that specifies an integration target class, which is an object to be associated with a class included in the integration-destination ontology, from classes other than the associated class and included in the integration-source ontology, an attribute-mapping-information acquiring unit that acquires attribute mapping information of an attribute which is held by a superclass of the integration target class and which is associated with the integration destination attribute in the integration-destination ontology, from the attribute mapping information stored, an associated class specifying unit that specifies an associated class having a shortest distance from the integration target class via a common superclass with the integration target class, among the associated classes included in the class mapping information, an integration-destination-associated-class specifying unit that specifies an integration-destination-associated class included in the integration-destination ontology and associated with the associated class specified from the class mapping information, and a position specifying unit that follows the inheritance relation as a route from the integration-destination-associated class specified, and specifies a class in the integration-destination ontology having the integration destination attribute corresponding to the attribute mapping information acquired by the attribute-mapping-information acquiring unit as a position where the class associated with the integration target class is present.

According to another aspect of the present invention, an ontology-integration supporting method includes a class specifying of specifying an integration target class, which is included in an integration-source ontology and is an object to be associated with a class included in an integration-destination ontology, from classes other than an associated class stored in class mapping information in which a class included in the integration-source ontology and a class included in the integration-destination ontology are associated with each other, an attribute-mapping-information acquiring of acquiring attribute mapping information of an attribute held by a superclass of the integration target class and associated with an integration destination attribute in the integration-destination ontology, from attribute mapping information in which the associated class which is a class in the integration-source ontology and associated in the class mapping information, an attribute held by a superclass of the associated class, and the integration destination attribute which is an attribute of a class in the integration-destination ontology and corresponding to the associated class are associated with each other, an associated class specifying of specifying an associated class having a shortest distance from the integration target class via a common superclass with the integration target class, among the associated classes included in the class mapping information, an integration-destination-associated destination-associated class specifying of specifying an integration-destination-associated class included in the integration-destination ontology and associated with the associated class specified in the associated class specifying from the class mapping information, and a position specifying of, by following an inheritance relation as a route from the integration-destination-associated class specified, specifying a class which is in the integration-destination ontology and which has the integration destination attribute corresponding to the attribute mapping information acquired in the attribute-mapping-information acquiring as a position where the class associated with the integration target class is present.

According to still another aspect of the present invention, a computer program product having a computer readable recording medium including a plurality of instructions for integrating hierarchical ontologies in which an attribute of a superclass is inherited by a subclass, which is executable by a computer, wherein the instructions make the computer execute a class specifying of specifying an integration target class, which is included in an integration-source ontology and is an object to be associated with a class included in an integration-destination ontology, from classes other than an associated class stored in class mapping information in which a class included in the integration-source ontology and a class included in the integration-destination ontology are associated with each other, an attribute-mapping information acquiring of acquiring attribute mapping information of an attribute held by a superclass of the integration target class and associated with an integration destination attribute in the integration-destination ontology, from attribute mapping information in which the associated class which is a class in the integration-source ontology and associated in the class mapping information, an attribute held by a superclass of the associated class, and the integration destination attribute which is an attribute of a class in the integration-destination ontology and corresponding to the associated class are associated with each other, an associated class specifying of specifying an associated class having a shortest distance from the integration target class via a common superclass with the integration target class, among the associated classes included in the class mapping information, an integration-destination-associated class specifying of specifying an integration-destination-associated class included in the integration-destination ontology and associated with the associated class specified in the associated class specifying from the class mapping information, and a position specifying of, by following an inheritance relation as a route from the integration-destination-associated class specified, specifying a class which is in the integration-destination ontology and which has the integration destination attribute corresponding to the attribute mapping information acquired in the attribute-mapping-information acquiring as a position where the class associated with the integration target class is present.

BRIEF DESCRIPTION OF THE DRAWINGS

FIG. 5 is an example of a table structure of an attribute table stored in the ontology information storage unit according to the first embodiment;

FIG. 6 is an example of a table structure of an instance table stored in the ontology information storage unit according to the first embodiment;

FIG. 7 is an example of a table structure of a class mapping table stored in a class mapping storage unit according to the first embodiment;

DETAILED DESCRIPTION OF THE INVENTION

Exemplary embodiments of an ontology-integration-position specifying apparatus, an ontology-integration supporting method, and an ontology-integration supporting computer program product according to the present invention will be explained below in detail with reference to the accompanying drawings. In the embodiments described below, an ontology-integration-position specifying apparatus is applied to an integration support server as an example; however, the ontology-integration-position specifying apparatus can be applied to any device.

Figure 1:
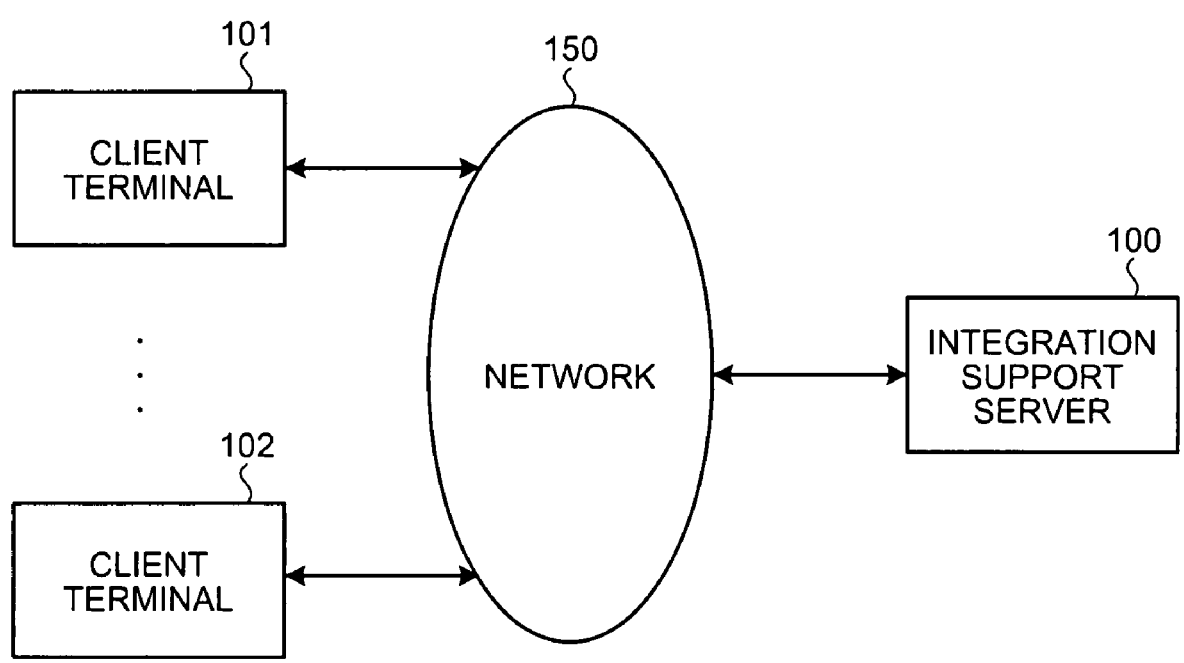
FIG. 1 is a schematic diagram of a network configuration of an ontology-integration support system according to a first embodiment.

As shown in FIG. 1, in an ontology-integration support system according to a first embodiment of the present invention, an integration support server 100, a client terminal 101, and a client terminal 102 are connected with each other via a network 150. The first embodiment assumes a client server system shown in FIG. 1.

The network 150 can be any network, and for example, is a local area network (LAN) or a public network. Only two client terminals are shown in FIG. 1, however, the number of the client terminals connected to the network 15 is not limited.

Figure 2:
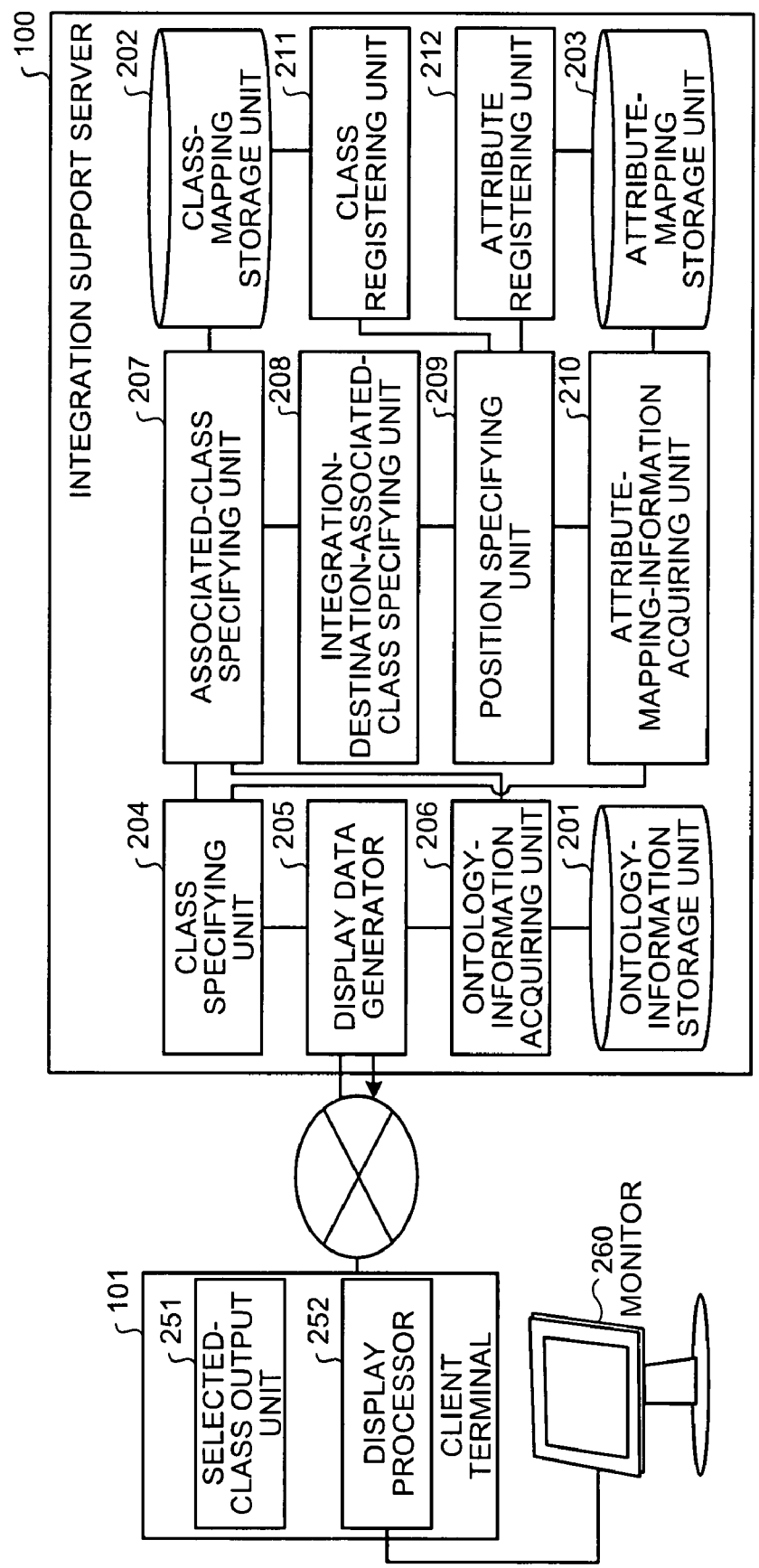
FIG. 2 is a block diagram of an integration support server and a client terminal according to the first embodiment.

A user refers to an ontology and the like using a monitor 260 connected to the client terminal 101 and shown in FIG. 2, and performs an operation on the client terminal 101 or the like for integrating ontologies stored in the integration support server 100.

The ontology used in the first embodiment is explained first. The hierarchical ontology according to the first embodiment forms a tree structure of classes by arranging the classes in a hierarchical manner. The class here is a representation of a concept, and for example, it is a "product", "vehicle", or the like.

The class included in the hierarchical ontology is a collection of "attributes", which are characteristics of the class. According to a mathematical definition, the collection of attributes is "intension".

Figures 3, 4:
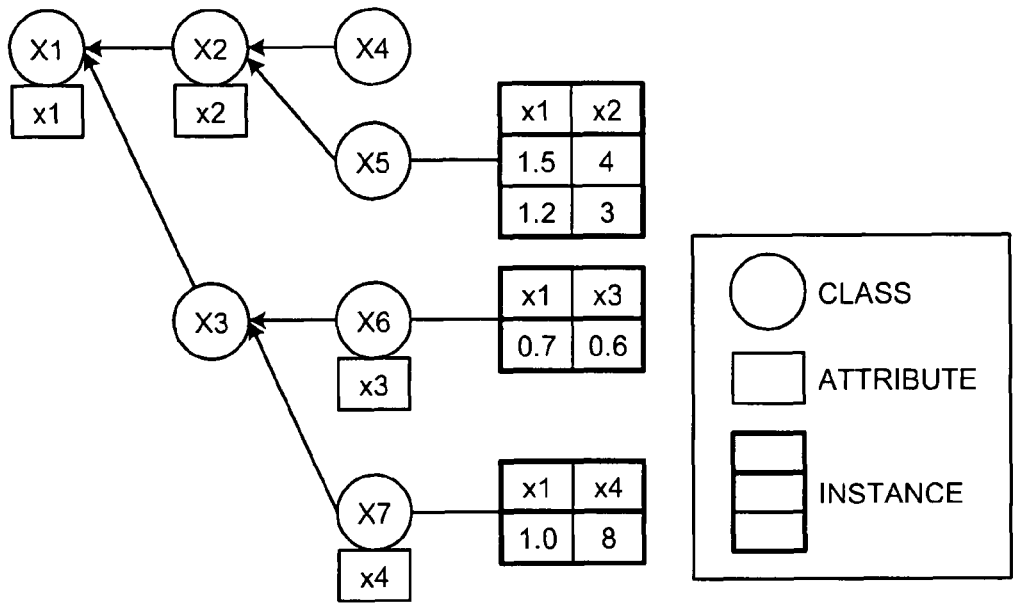
FIG. 3 is a conceptual diagram of an example of a hierarchical ontology and instances used in the first embodiment.
FIG. 4 is an example of a table structure of an ontology class table stored in an ontology information storage unit in the integration support server according to the first embodiment.

The hierarchical ontology is characterized in that the attribute held by the superclass is inherited by all classes arranged in the more specific order, in other words, by all classes on a partial hierarchy, for which the superclass is a root. In the hierarchical ontology, a direct superclass is often called a "parent class", a direct subclass is called a "child class", all the superclasses are called "ancestors", and all the subclasses are called "descendants". Likewise, in the first embodiment, these terms are used in the above-defined meaning. In FIG. 3, classes having a parent-child relationship are connected by a line segment.

The hierarchical ontology holds instances as elements. The instance is described according to the attribute held by the class. According to the mathematical definition, a collection of instances is called an "extension" of the class, and each instance is called a "member". In the hierarchical ontology, all instances of the subclasses are also the instances of the superclass thereof.

However, when the instance of the subclass is referred to from the superclass, only an attribute value held by the superclass can be referred to. In the general hierarchical ontology, instances are often present only in the most-specific classes. However, the first embodiment is not limited thereto, and the instance can be present in the superclass.

An example shown in FIG. 3 is a hierarchical ontology including seven classes, that is, X1, X2, X3, X4, X5, X6, and X7. The classes X2 and X3 are child classes of X1, X4 and X5 are child classes of X2, and X6 and X7 are child classes of X3.

In FIG. 3, attributes of some classes are defined. For example, attribute x1 is defined in class X1, attribute x2 is defined in class X2, attribute x3 is defined in class X6, and attribute x4 is defined in class X7. As described earlier, the attribute held by the superclass is inherited by the subclass. For example, class X6 inherits and holds attribute x1, which is defined in the superclass X1, as well as attribute x3 which is defined in class X6. Likewise, other classes inherit and hold the attributes of the superclasses.

A table enclosed by a bold line in FIG. 3 indicates an example of instances held by the class to which the table is connected by a line segment. In the example shown in FIG. 3, classes X5, X6, and X7 have instances. Each instance holds a value for each attribute held by the class according to the attribute. In the example shown in FIG. 3, the first row of the instance is a header of the table and shows an attribute name of each attribute, and the second and subsequent rows are values indicating the attributes.

According to the definition of the hierarchical ontology, class X2 can refer to the instances in the child classes X4 and X5, and class X3 can refer to the instances in the child classes X6 and X7. Further, class X1 can refer to all the instances in the ontology described in FIG. 3, because class X1 is the superclass of all the other classes in this ontology. However, the class X1 can refer only to the values of the attribute x1, which is defined by the class X1 itself, in each instance. Likewise, classes X2 and X3 can refer only to the values of the attributes defined by themselves and of the attributes inherited from the superclass.

In the ontology according to the first embodiment, the class hierarchy is represented by a simple tree; however, the structure of the class hierarchy is not limited to the simple tree. The class hierarchy can take any structure, and may adopt a concept of "multiple inheritance" where a plurality of parent classes exist, a concept of "partial inheritance" where a class imports some attributes of another class though there is no parent-child relation in a strict sense, or the like.

Returning to FIG. 2, the client terminal 101 includes a selected-class output unit 251 and a display processor 252. The client terminal 101 activates an ontology input/output program.

When the user selects a class to be associated from classes included in the integration-source ontology by using an input device (not shown), the selected-class output unit 251 outputs the selected class to the integration support server 100 described later.

The display processor 252 displays a screen on the monitor 260. For example, while the ontology input/output program is running, the display processor 252 generates an ontology-integration operation screen based on the data received from the integration support server 100 and outputs the ontology-integration operation screen to the monitor 260. The user performs an operation and/or setting on the displayed screen using the input device, and the client terminal 101 accepts data or a command based on the contents of the operation and/or the setting by the user, and outputs the accepted data or the like to the integration support server 100 if necessary. An example of the ontology-integration operation screen will be described later.

The integration support server 100 includes an ontology-information storage unit 201, a class-mapping storage unit 202, an attribute-mapping storage unit 203, a class specifying unit 204, a display data generator 205, an ontology-information acquiring unit 206, an associated-class specifying unit 207, an integration-destination-associated-class specifying unit 208, a position specifying unit 209, an attribute-mapping-information acquiring unit 210, a class registering unit 211, and an attribute registering unit 212.

The ontology-information storage unit 201 stores an ontology class table, an attribute table, and an instance table.

As shown in FIG. 4, the ontology class table holds a class ID, a parent class ID, an attribute-import-source class ID, and a class name in association with each other. Accordingly, a class name and a parent class can be specified from the class information stored in each record.

The ontology class table allows for specification of a parent class of each class, which means that the ontology class table stores the hierarchical structure of the classes included in the ontology. In addition, partial inheritance destination is stored in an import-source class ID field. Since the ontology used in the first embodiment does not include a relation of partial inheritance, the import-source class ID field is blank. In a name field of the ontology class table, information on the names of the classes is stored so that a person can intuitively identify the class.

As shown in FIG. 5, the attribute table holds an attribute ID, a defining class ID, and a name in association with each other. Accordingly, the name of a class for which each attribute is defined and the name of the attribute can be specified.

As shown in FIG. 6, the instance table is a table in which attribute IDs and class IDs are listed as headers so as to indicate which class each instance belongs. In this example, each column of the table corresponds to one attribute in the ontology except the leftmost column.

One instance table manages instances of all the classes included in one ontology. Therefore, the number of prepared instance tables corresponds to the number of ontologies.

The table structure stored in the ontology-information storage unit 201 is not limited to the structure described above. For example, a relation between the classes and definition information of each class can be stored in separate tables, or the instance table can be prepared for, each class. Thus, ontology information can be stored in any format, so long as the same meaning is expressed.

The class-mapping storage unit 202 stores a class mapping table. As shown in FIG. 7, the class mapping table holds a class. ID of the integration source and a class ID of the integration destination in association with each other. Since the class in the integration source and the class in the integration destination are registered in the class mapping table in association with each other, association between the classes in different ontologies is achieved.

In an example shown in FIG. 7, correspondence of class X5 in integration-source ontology X with class Y7 in integration-destination ontology Y, and correspondence of class X7 in integration-source ontology X with class Y4 in integration-destination ontology Y are stored.

Figures 8, 9:
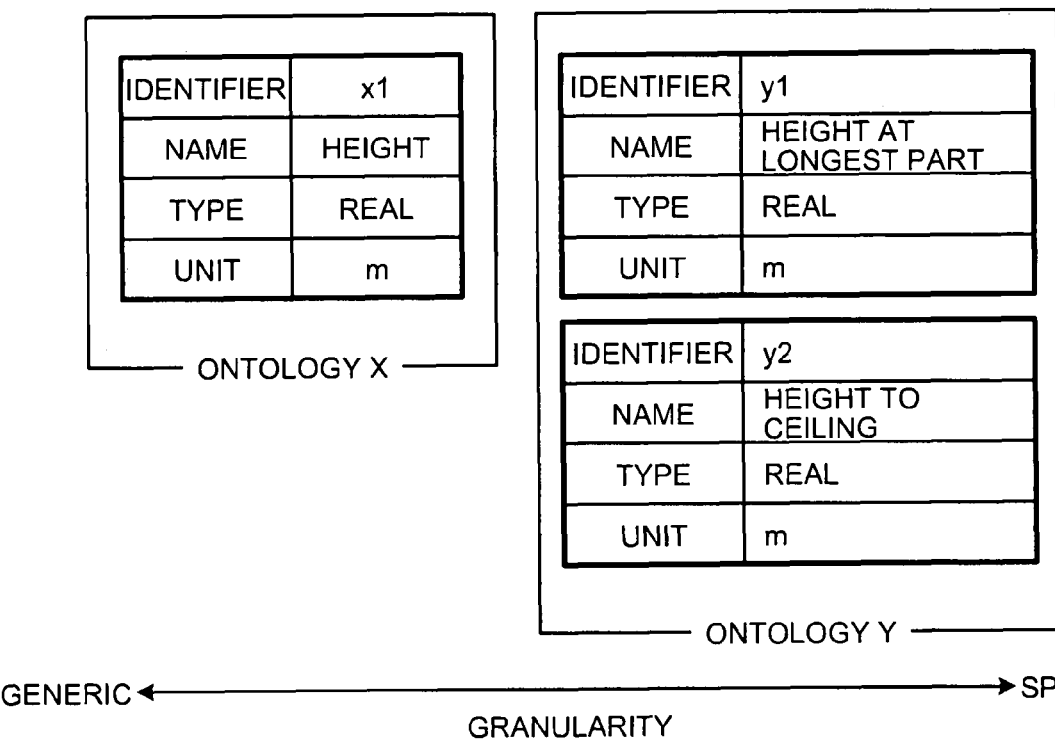
FIG. 8 is an example of a table structure of an attribute mapping table stored in an attribute mapping storage unit according to the first embodiment.
FIG. 9 is a schematic diagram for explaining a concept of a difference in granularity of the attribute.

The attribute-mapping storage unit 203 stores an attribute mapping table. As shown in FIG. 8, the attribute mapping table holds a class ID of the integration source, an attribute ID of the integration source, and an attribute ID of the integration destination in association with each other. Since the class of the integration source, the attribute of the integration source, and the attribute of the integration destination are registered in the attribute mapping table in association with each other, association between attributes in different ontologies is achieved. Further, in the attribute mapping table, the class of the integration source is also stored in association with the attributes.

In an example shown in FIG. 8, attribute mapping information of five classes, X1, X2, X3, X5, and X7 included in the integration-source ontology is stored.

The granularity of the attribute is explained next. Generally, the hierarchical ontology forms a closed world by itself. Therefore, the definition of class and attribute included in the ontology, type and number of attributes defined for each class, and configuration of the class hierarchy are different for each ontology. Accordingly, the attribute defined in an arbitrary ontology can be defined in a smaller range in another ontology. Therefore, a size scale of the range intended by the attribute is referred to as "granularity". As the range becomes smaller, it is said that "the granularity of the attribute is specific", whereas as the range becomes larger, it is said that "the granularity of the attribute is generic".

In an example shown in FIG. 9, attribute x1 defined in ontology X and attributes y1 and y2 defined in ontology Y are shown. In ontology X, attribute x1 whose name is "HEIGHT" is defined. In ontology Y, attribute y1 whose name is "HEIGHT AT LONGEST PART" and attribute y2 whose name is "HEIGHT TO CEILING" are defined. In the example shown in FIG. 9, attributes x1, y1, and y2 are attributes respectively expressing a "height of something". However, attribute x1 indicates a broader concept than attributes y1 and y2. Accordingly, it can be said that attribute x1 has more generic granularity than attributes y1 and y2.

In the conventional technique, the difference in granularity of the attributes causes a problem in automatic integration of ontologies. At the time of automatic integration of ontologies, the attribute in the integration-source ontology and the attribute in the integration-destination ontology need to be associated with each other. However, when the attribute in the integration-source ontology has a more generic granularity than the corresponding attribute in the integration-destination ontology, plural attributes in the integration-destination ontology can be candidates for the mapping attribute. In such a case, classes and attributes cannot be associated with each other properly according to the conventional technique. Therefore, the system according to the first embodiment specifies the attribute in the integration-destination ontology based on the class and the attribute in the integration-source ontology using the table structure of the attribute-mapping storage unit 203. Accordingly, even if there is a plurality of candidates for the corresponding attribute, association can be readily realized. An association process will be described later.

The class mapping table in the class-mapping storage unit 202 stores association information of already-associated classes in the integration-source ontology and the integration-destination ontology. Further, the attribute mapping table in the attribute-mapping storage unit 203 stores association information of already-associated attributes in the integration-source ontology and the integration-destination ontology. Thus, to perform automatic association of classes by using the information stored in the class mapping table and the attribute mapping table, certain association information needs to be stored in advance.

The user or the integration support server 100 refers to the integration-source ontology X and the integration-destination ontology Y, to achieve association between classes having a clear correspondence. Accordingly, information is accumulated in the class mapping table and the attribute mapping table. By using the accumulated information, mapping between classes whose correspondence is initially ambiguous becomes clear. Accordingly, the integration support server 100 can automatically associate classes included in the ontologies with each other.

The configurations of the class mapping table shown in FIG. 7 and the attribute mapping table shown in FIG. 8 are not limited to the described configurations, and can be any table structure which has the explained meaning.

The class registering unit 211 registers the classes included in the integration-source ontology X and the classes included in the integration-destination ontology Y in the class mapping table in association with each other.

When the classes included in the integration-source ontology X and the classes included in the integration-destination ontology Y are associated with each other, the attribute registering unit 212 registers the attributes of the associated classes of the integration source and the attributes of the associated classes of the integration destination in the attribute mapping table in association with each other. Further, the attribute registering unit 212 performs the registration not only for associated class of the integration source, but also for the ancestor class of the associated class of the integration source so as to register the same combination of attributes in association with the ancestor class.

Figure 10:
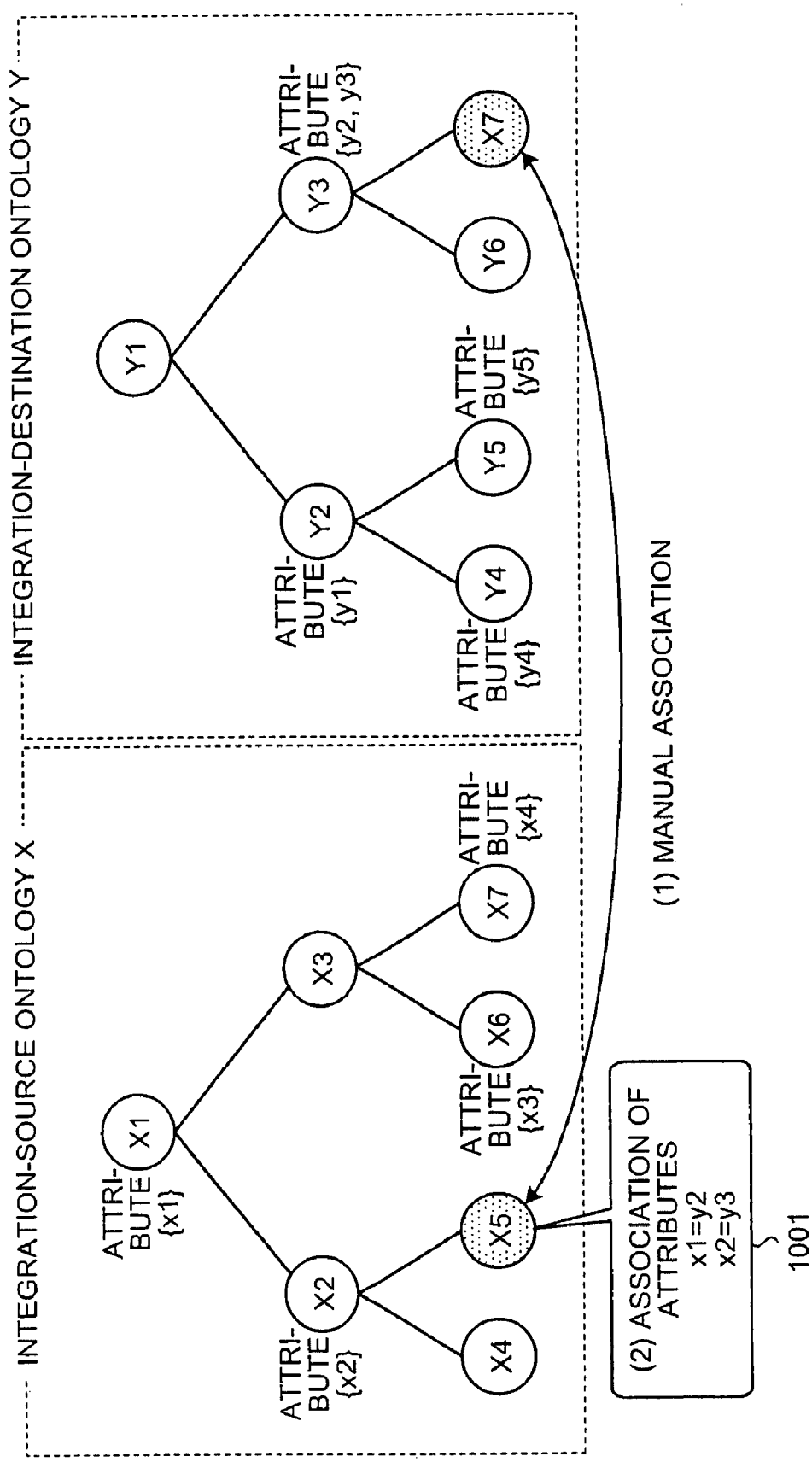
FIG. 10 is a conceptual diagram of a first example in which a class included in an integration-source ontology and a class included in an integration-destination ontology are manually associated with each other by a user.

In an example shown in FIG. 10, the integration-source ontology X is integrated into the integration-destination ontology Y. In the example of FIG. 10, the user determines that class X5 corresponds to class Y7 by referring to the integration-source ontology X and the integration-destination ontology Y.

When the user performs an operation to associate class X5 with class Y7, the client terminal 101 outputs operation information indicating the associating operation to the integration support server 100. Accordingly, the class registering unit 211 in the integration support server 100 registers class X5 and class Y7 in the class mapping table in association with each other.

Thereafter, the attribute registering unit 212 registers the attribute of class X5 and the attribute of class Y7 in the attribute mapping table in association with each other. In the example shown in FIG. 10, as shown by reference numeral 1001, the attribute registering unit 212 registers pieces of mapping information in the attribute mapping table, associating attribute x1 of class X5 with attribute y2, and attribute x2 of class X5 with attribute y3. The attributes to be associated with each other can be specified by any manner, and for example, the integration support server 100 can specify the attributes to be associated by calculating a degree of similarity between attributes, or the user can specify the attributes to be associated manually. After association of attributes of the associated classes has finished, further association of attributes is performed with respect to the ancestor classes as explained below.

Figure 11:
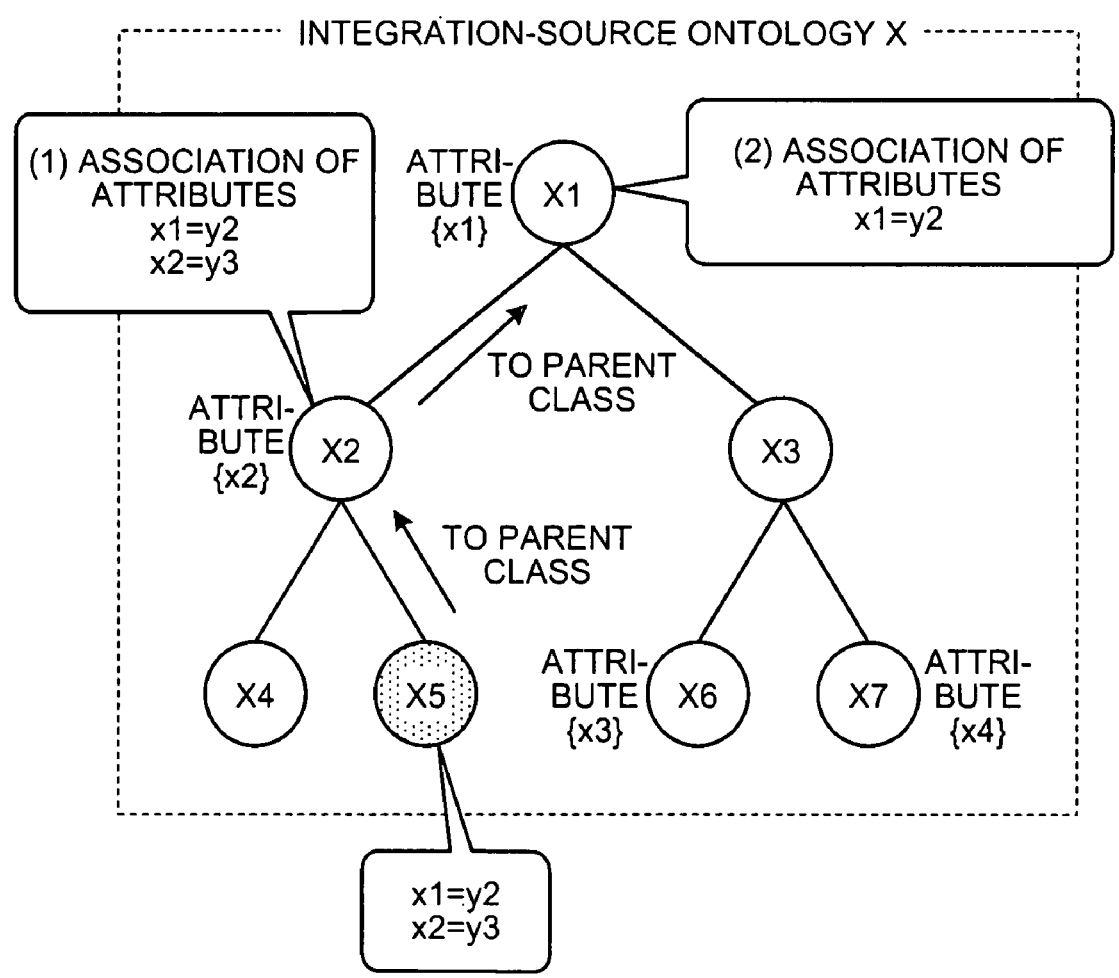
FIG. 11 is a conceptual diagram of a first example in which, after a class included in the integration-source ontology and a class included in the integration-destination ontology are associated with each other, attributes of ancestor classes are associated with attributes of the class included in the integration-source ontology.

In the integration-source ontology X shown in FIG. 11, among the attributes held by class X5, which is associated with class Y7, attribute x2 is defined in class X2 and attribute x1 is defined in class X1.

Therefore, the attribute registering unit 212 registers these attributes (i.e., x1 and x2) in association with the attributes of all classes in which these attributes (i.e., x1 and x2) are defined and all classes that inherit these attributes in the integration-destination ontology Y.

Specifically, the attribute registering unit 212 goes back to class X2, which is the parent class of class X5, and registers class X2, attribute x1, and attribute y2 in association with each other and class X2, attribute x2, and attribute y3 in association with each other in the attribute mapping table. Thereafter, the attribute registering unit 212 further goes back to class X1, which is the parent class of class X2, and registers class X1, attribute x1, and attribute y2 in association with each other in the attribute mapping table.

Figure 12:
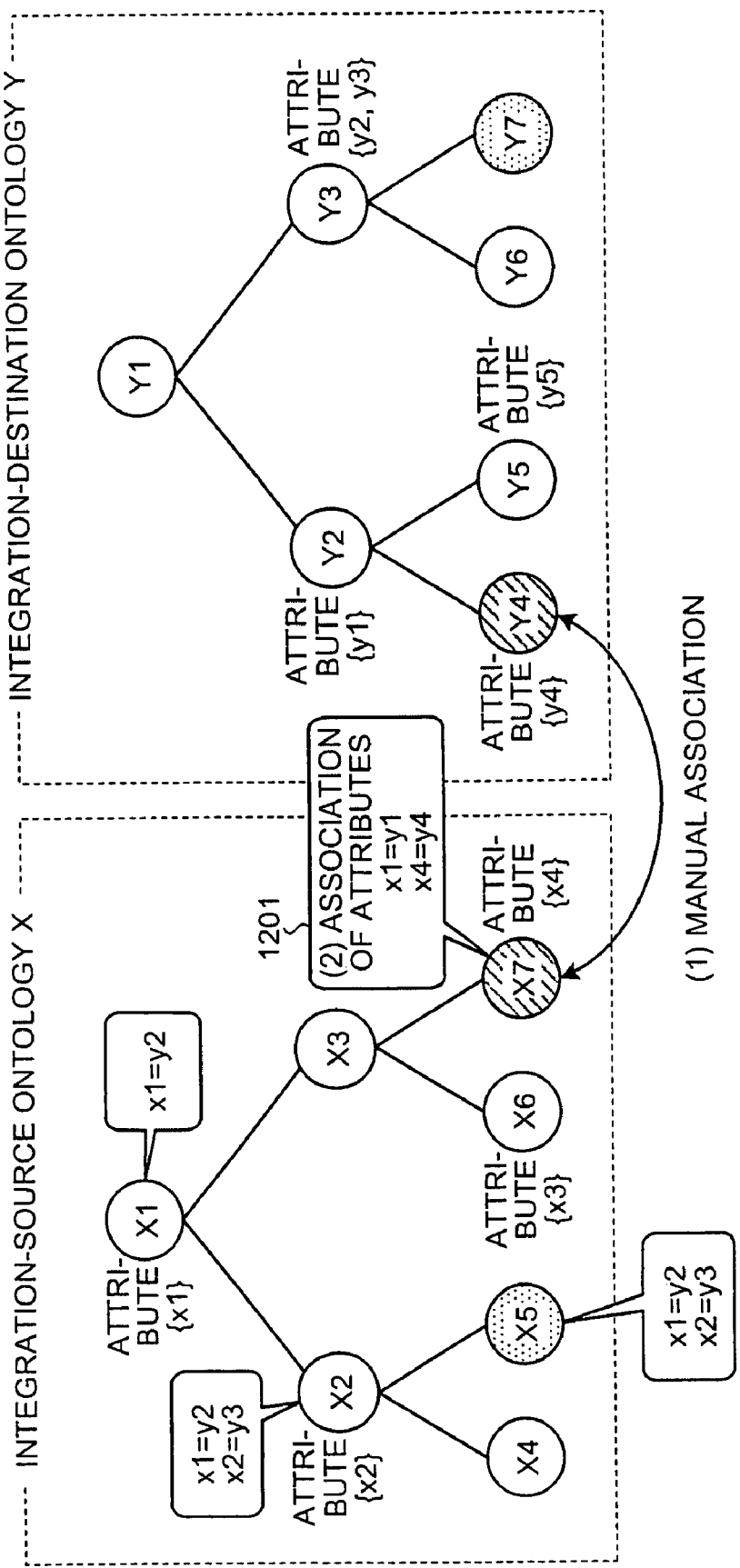
FIG. 12 is a conceptual diagram of a second example in which a class included in the integration-source ontology and a class included in the integration-destination ontology are manually associated with each other by a user.

FIG. 12 assumes a case that the user determines that class X7 corresponds to class Y4 by referring to the integration-source ontology X and the integration-destination ontology Y, similarly to FIG. 10.

When the user performs the operation to associate class X7 with class Y4, the client terminal 101 outputs operation information indicating the associating operation to the integration support server 100. Accordingly, the class registering unit 211 in the integration support server 100 registers class X7 and class Y4 in the class mapping table in association with each other.

Thereafter, the attribute registering unit 212 registers the attributes of class X7 and the attributes of class Y4 in the attribute mapping table in association with each other. In the example shown in FIG. 12, as shown by reference numeral 1201, the attribute registering unit 212 registers pieces of mapping information in the attribute mapping table, associating attribute x1 of class X7 with attribute y1, and attribute x4 of class X7 with attribute y4. After the association of the attributes of the associated classes has finished, further association of attributes is performed with respect to the ancestor classes.

Figure 13:
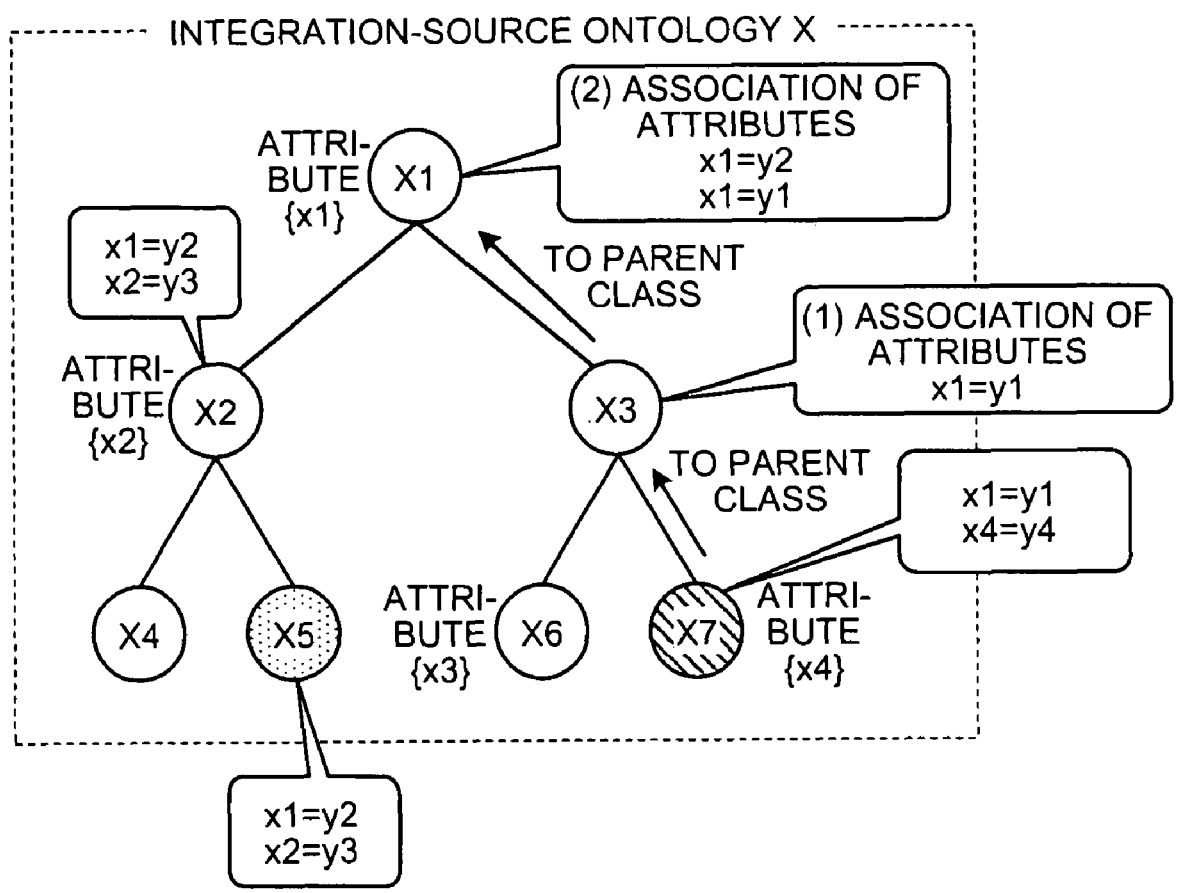
FIG. 13 is a conceptual diagram of an example in which, after a class included in the integration-source ontology and a class included in the integration-destination ontology are associated with each other, attributes are associated with ancestor classes in the integration-source ontology.

In the integration-source ontology X shown in FIG. 13, among the attributes held by class X7, which is associated with class Y4, attribute x4 is defined in class X7 and attribute x1 is defined in class X1.

Therefore, the attribute registering unit 212 registers attribute x1 in association with attribute y1 of the integration-destination ontology Y, with respect to all classes in which attribute x1 is defined and all classes that inherit attribute x1. The attribute registering unit 212 does not perform association in the ancestor class relative to attribute x4, because attribute x4 is defined by class X7.

Specifically, the attribute registering unit 212 goes back to class X3, which is the parent class of class X7, and registers class X3, attribute x1, and attribute y1 in association with each other in the attribute mapping table. Thereafter, the attribute registering unit 212 further goes back to class X1, which is the parent class of class X3, and registers class X1, attribute x1, and attribute y1 in association with each other in the attribute mapping table.

By performing a registration process shown in FIGS. 10 to 13, attribute x1 is associated with attribute y1, and also with attribute y2. Thus, in the registration process according to the first embodiment, in the superclass, a plurality of attributes of the integration destination is associated with one attribute of the integration source, due to a difference in the granularity of the attributes or the like.

The class mapping table and the attribute mapping table after the mapping relations are registered in the registration process shown in FIGS. 10 to 13 are the same, respectively, as those shown in FIG. 7 and FIG. 8, and explanations thereof will not be repeated. In the attribute mapping table shown in FIG. 8, it can be confirmed that the mapping information of attribute y1 and the mapping information of attribute y2 are stored with respect to attribute x1 of the integration-source ontology X1.

The mapping relations are registered in the class mapping table and the attribute mapping table by the registration process shown in FIGS. 10 to 13. Accordingly, automatic association becomes possible with the use of the stored information.

The ontology-information acquiring unit 206 acquires information of the integration-source ontology and information of the integration-destination ontology from the ontology-information storage unit 201.

The display data generator 205 generates screen information to be output to the client terminal 101. The screen information generated by the display data generator 205 is generated by using the information of the integration-source ontology and the information of the integration-destination ontology input from the ontology-information storage unit 201.

The screen information generated by the display data generator 205 includes information indicating a hierarchy of the integration-source ontology, a hierarchy of the integration-destination ontology, and mapping relations between the already associated classes and attributes. The client terminal 101 then displays an ontology-integration screen according to the screen information. Accordingly, the user performs various operations, referring to the information displayed on the screen. When the user selects a class to be associated, the selected-class output unit 251 outputs the selected class to the integration support server 100.

Figure 14:
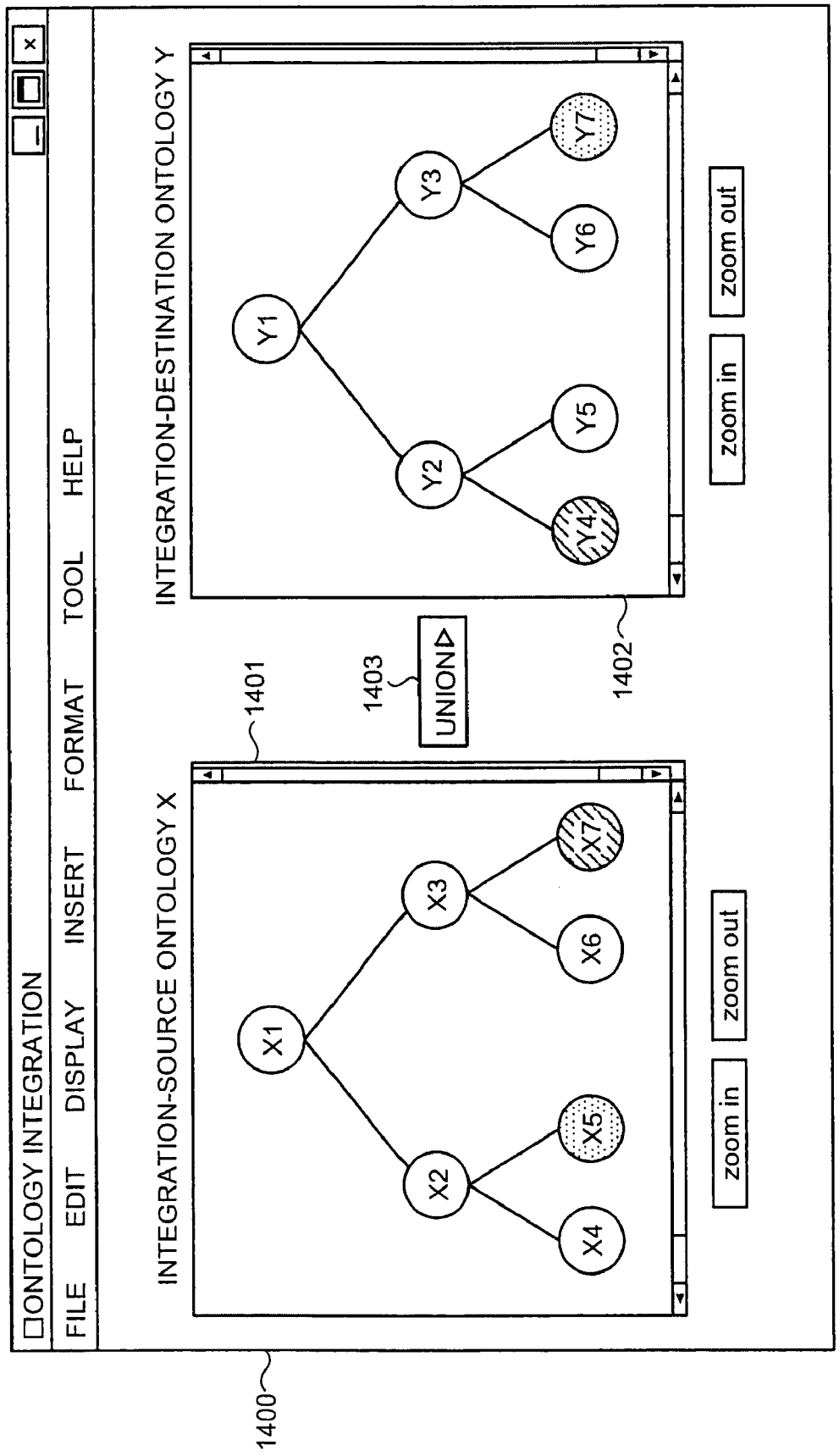
FIG. 14 is an example of an ontology-integration screen displayed by the client terminal according to screen information.

As shown in FIG. 14, the ontology-integration screen 1400 includes an integration-source ontology display area 1401 for displaying the class hierarchy of the integration-source ontology, an integration-destination ontology display area 1402 for displaying the class hierarchy of the integration-destination ontology, and various buttons such as "UNION" button 1403 that indicates a start of the integration process.

The integration-source ontology display area 1401 and the integration-destination ontology display area 1402 shown in FIG. 14 display by color the already associated classes, that is, class X5 in the integration-source ontology and class Y7 in the integration-destination ontology.

This is for the user who refers to the ontology-integration screen to be able to distinguish unassociated classes from associated classes. Therefore, so long as the unassociated classes can be distinguished from the associated classes, the classes can be displayed in any manner, for example, symbols indicating the classes may be made different.

Further, when the user selects the associated class in the integration-source ontology using a pointing device such as a mouse, an icon or the like can be displayed to indicate a class associated with the selected class and included in the integration-destination ontology. Accordingly, the user can grasp the correspondence of the classes visually. The correspondence of the classes can be displayed by any means other than icons, and for example, a class associated with the selected class can be made noticeable by various effects such as blinking.

Further, on the ontology-integration screen, the user can select a class and a partial hierarchy in the integration-source ontology by a click and drag operation of various buttons via the input device of the client terminal 101. The user can select an integration target class to be associated on the integration-source ontology display area 1401 by a drag operation using the pointing device. When the UNION button 1403 is pressed in this state, the selected-class output unit 251 outputs information of the selected class to the integration support server 100. When the integration support server 100 receives the information of the selected class, the information is input to the class specifying unit 204.

Returning to FIG. 2, upon reception of the information of the selected class as an input from the client terminal 101 or 102 via the network 150, the class specifying unit 204 specifies the class in the input information as the integration target class to be associated. It is assumed that the integration target class is a class which is included in the integration-source ontology, and which has not been associated with the classes included in the integration-destination ontology.

The attribute-mapping-information acquiring unit 210 acquires attribute mapping information. The attribute mapping information means information stored in the attribute mapping table.

The attribute-mapping-information acquiring unit 210 reshapes the attribute mapping information to an attribute list including all the attributes of the integration target class in the integration-source ontology X and also including the attributes in the integration-destination ontology Y (hereinafter integration-destination attributes) corresponding to the attribute defined in the ancestor class of the integration target class. Accordingly, the attribute list can be acquired. The detailed process procedure will be explained later.

Figure 15:
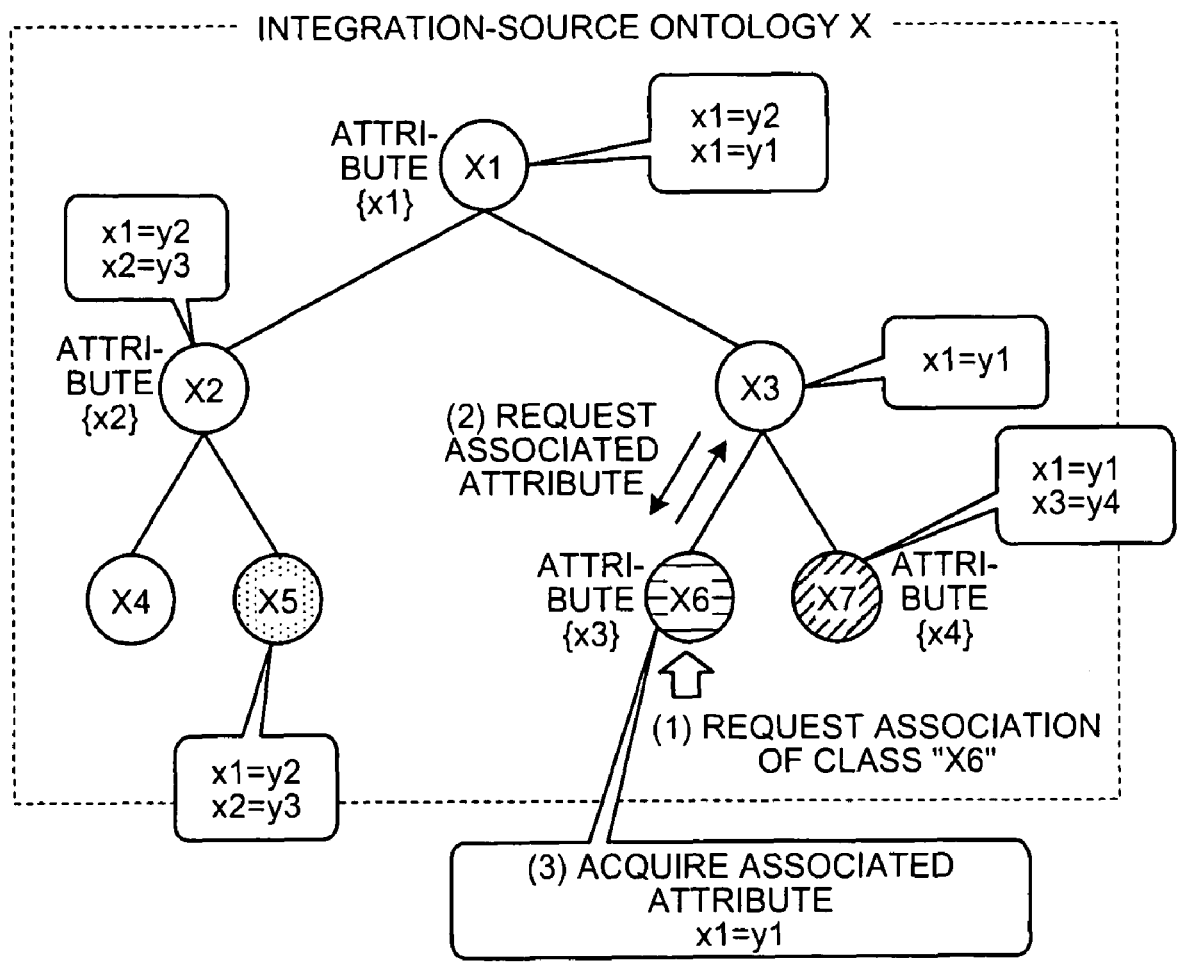
FIG. 15 is a conceptual diagram of a procedure performed by an attribute-mapping-information acquiring unit according to the first embodiment until information of an attribute held by an integration target class, and stored in the attribute mapping table, is acquired.

An example shown in FIG. 15 assumes a case where association of class X6 is requested from the user. In response, the class specifying unit 204 specifies class X6 as an integration target class.

In the attribute mapping table, attribute information of the integration target class X6 has not been stored. Therefore, the attribute-mapping-information acquiring unit 210 requests an acquisition of attribute mapping information of the ancestor classes of the integration target class X6. In the attribute mapping table shown in FIG. 8, mapping information of the attribute held by class X3, which is the parent class of class X6, is stored.

Therefore, the attribute-mapping-information acquiring unit 210 acquires mapping information indicating the correspondence between attribute x1 held by class X6 and attribute y1.

The associated-class specifying unit 207 acquires class mapping information from the class-mapping storage unit 202 to specify a class which is closest to the integration target class via a common ancestor class of the integration target class among classes in the integration-source ontology (hereinafter, thus specified class is referred to as an associated class). The class mapping information stands for information stored in the class mapping table.

The integration-destination-associated-class specifying unit 208 uses the associated class specified by the associated-class specifying unit 207, to specify a class included in the integration-destination ontology Y and associated with the associated class from the class mapping table (hereinafter, the specified class is referred to as an integration-destination-associated class).

The position specifying unit 209 tracks back the inheritance relation of classes as a route (hereinafter, a class route) from the specified integration-destination-associated class, thereby specifying a class which is assumed to be the common ancestor of the class corresponding to the integration target class and the integration-destination-associated class. The specifying method will be described later.

The position specifying unit 209 searches for the class corresponding to the integration target class, using the specified class as a search start position. Then, the position specifying unit 209 specifies a position where the class associated with the integration target class is present, based on whether a class has the attribute of the integration-destination ontology included in the acquired attribute list. A detailed process procedure will be described later.

Figure 16:
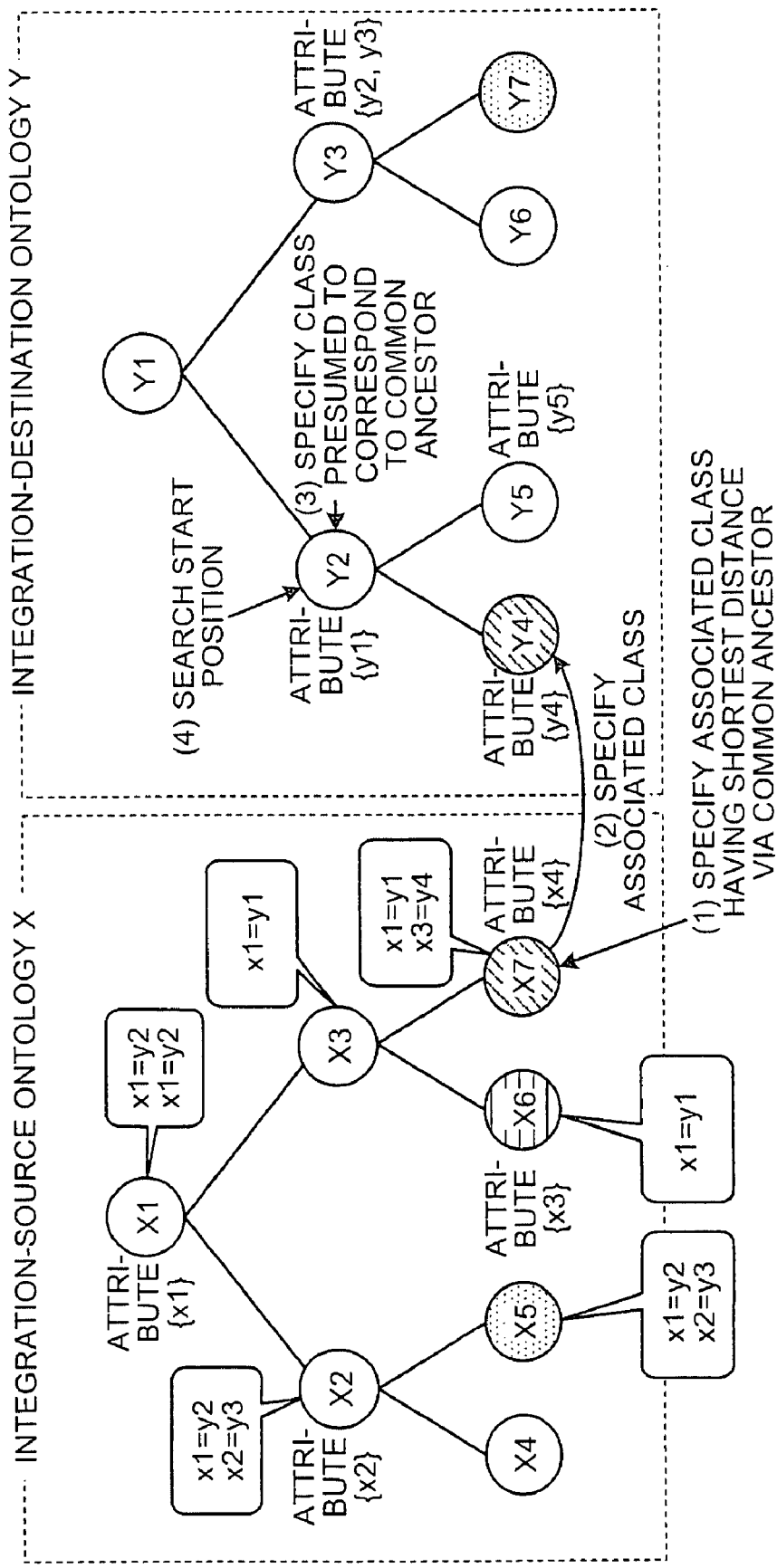
FIG. 16 is a conceptual diagram of a process since an associated class having the shortest distance from the integration target class via a common ancestor class has been specified-until a position for searching for a class corresponding to the integration target class in the integration-destination ontology is specified by the integration support server.

As shown in FIG. 16, the associated-class specifying unit 207 specifies class X7 as the associated class located at the shortest distance from the integration target class X6 via the common ancestor.

The integration-destination-associated-class specifying unit 208 specifies integration-destination-associated class Y4, associated with associated class X7 in the class mapping table. The position specifying unit 209 follows the class route from the integration-destination-associated class Y4. The position specifying unit 209 then specifies class Y2 which is assumed to be the common ancestor of the class corresponding to the integration target class and the integration-destination-associated class Y4. The position specifying unit 209 then determines class Y2 in the integration source as a search start position for the class corresponding to the integration target class.

Figure 17:
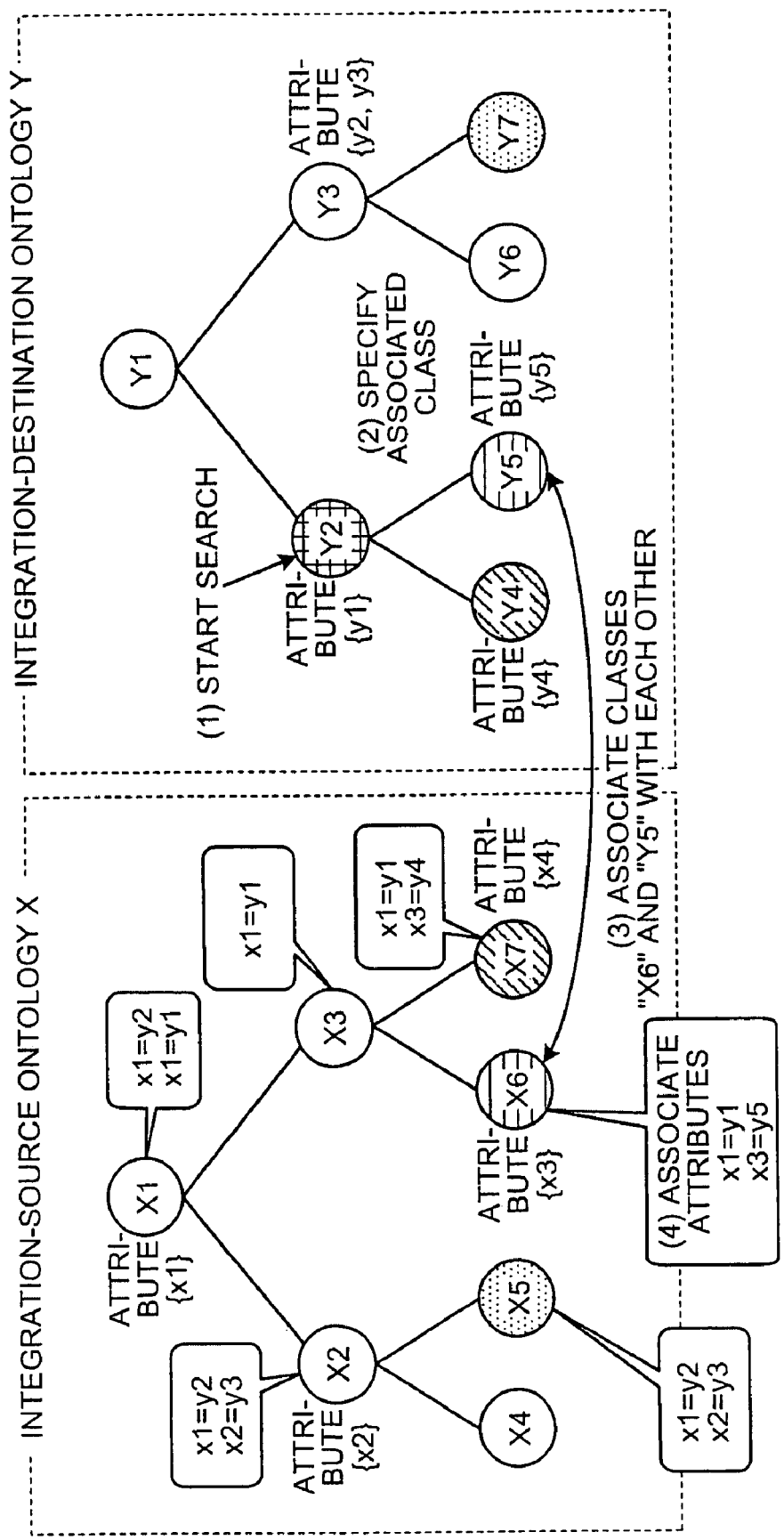
FIG. 17 is a conceptual diagram of a process since a class corresponding to the integration target class is detected from a search start position until attributes of the integration target class and the class corresponding to the integration target class are associated with each other by the integration support server.

As shown in FIG. 17, the position specifying unit 209 searches for the class corresponding to the integration target class X6 following the class route from class Y2, which is the search start position, in the integration source to specify class Y5 corresponding to the integration target class X6. A specification determination criterion will be described later.

After class Y5 corresponding to the integration target class X6 is specified, the class registering unit 211 registers the integration target class X6 and class Y5 in association with each other in the class mapping table. Thereafter, the attribute registering unit 212 registers mapping information of the associated attributes of class X6 and class Y5. In an example shown in FIG. 17, the attribute registering unit 212 registers attribute x3 and attribute y5 in association with each other in the attribute mapping table. A determination method of the attribute to be associated can be any method.

Upon completion of these processes, the display data generator 205 generates screen information in which the mapping information of classes and attributes has been updated, for the integration-destination ontology and the integration-source ontology. The generated screen information is output to the client terminal 101.

Figure 18:
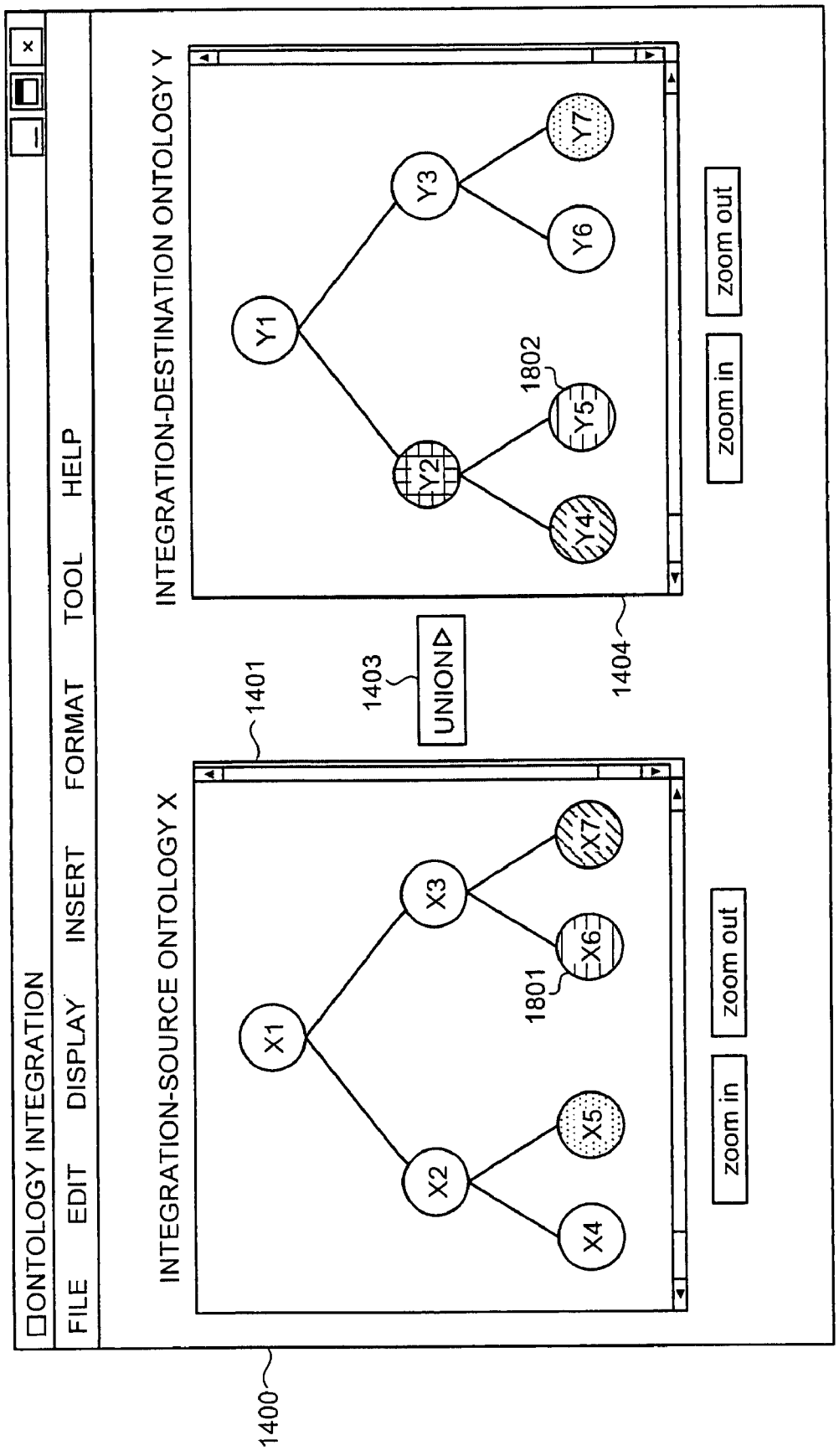
FIG. 18 is an example of an ontology-integration screen to be displayed by a client terminal according to screen information after the integration target class is associated.

On a screen shown in FIG. 18, mark 1801 indicating the integration target class X6 and mark 1802 indicating class Y5 associated with the integration target class X6 are displayed in the same color.

In the above process, a case of specifying a class associated with the integration target class has been explained. However, if there is no class corresponding to the integration target class, a corresponding class can be generated in the integration-destination ontology.

Figure 19:
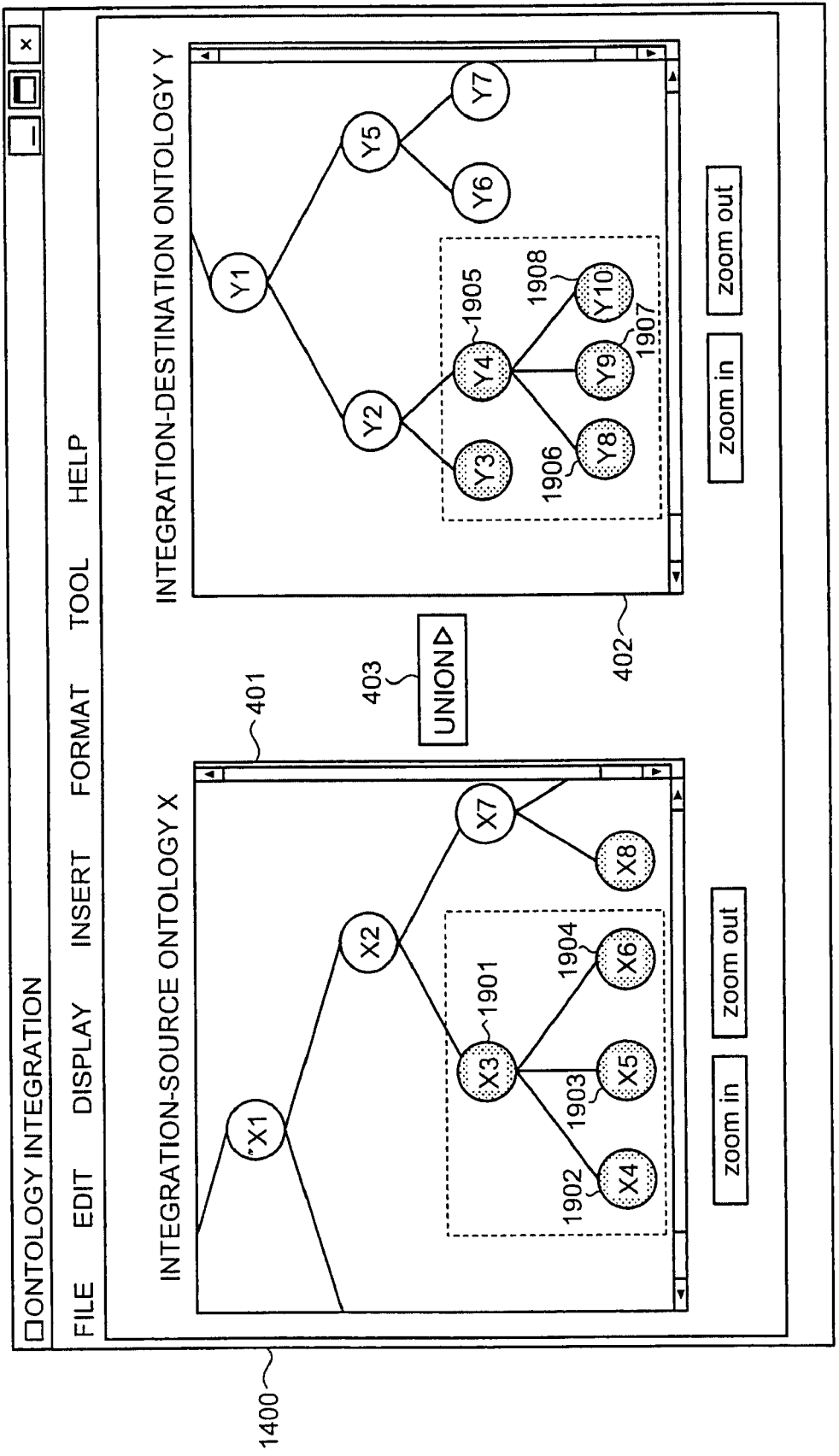
FIG. 19 is an example of the ontology-integration screen to be displayed by the client terminal according to the screen information after classes corresponding to the integration target class are generated.

In an example shown in FIG. 19, no class is present initially in a more specific order of class Y4 (indicated by mark 1905) in the integration-destination ontology. As a result of an association process, class X3 (mark 1901) and class Y4 (mark 1905) are associated with each other. However, there is no class corresponding to classes X4 (mark 1902), X5 (mark 1903), and X6 (mark 1904), i.e., subclasses of the class X3 in the integration-destination ontology. Therefore, the position specifying unit 209 newly generates classes Y8 (mark 1906), Y9 (mark 1907), and Y10 (mark 1908) in the integration-destination ontology as classes corresponding to classes X4, X5, and X6.

As shown in FIG. 19, the user can select a partial class hierarchy including classes X4, X5, and X6, and class X3 as their root in the integration-source ontology. In this case, when class X3 and class Y4 are associated with each other, classes corresponding to classes X4, X5, and X6 can be automatically generated as child classes of class Y4 in the integration-destination ontology.

A process procedure for associating the classes performed by the integration support server 100 is explained with reference to FIG. 20.

Firstly, the client terminal 101 receives selection of an unassociated class or a partial class hierarchy having the unassociated class as a root, from a class hierarchy displayed in the integration-source ontology display area 1401 on the ontology-integration screen shown in FIG. 14. When the client terminal 101 receives a click on the UNION button 1403, the selected class or partial class hierarchy is output to the integration support server 100. Accordingly, the integration support server 100 performs a process shown in FIG. 20.

The class specifying unit 204 in the integration support server 100 specifies a class (or a partial class hierarchy) for which an input is received from the client terminal 101 as the integration target class (step S2001).

The attribute-mapping-information acquiring unit 210 acquires the ontology information and the attribute mapping information (step S2002). The ontology information includes the class information and the attribute information of the integration-source ontology and the integration-destination ontology acquired from the ontology-information acquiring unit 206.

These pieces of information can be read beforehand by the attribute-mapping-information acquiring unit 210 at the time of initial setting of the integration support server 100 and stored in a random access memory (RAM) or the like. The information stored in the RAM or the like is updated only when information in one or more of the ontology-information storage unit 201, the class-mapping storage unit 202, and the attribute-mapping storage unit 203 is changed.

The attribute-mapping-information acquiring unit 210 acquires the mapping information (attribute list) of the attribute defined in the superclass of the integration target class from the ontology information and the attribute mapping information (step S2003). A detailed process procedure will be described later.

The attribute-mapping-information acquiring unit 210 then determines whether the acquired attribute mapping information is blank (step S2004). When determining that the attribute mapping information is blank (YES at step S2004), the attribute-mapping-information acquiring unit 210 ends the process.

When the attribute mapping information is blank, no class is associated between the integration-source ontology and the integration-destination ontology. Therefore, the automatic association of classes cannot be performed, and the process ends.

When determining that the attribute mapping information (attribute list) is not blank (NO at step S2004), the attribute-mapping-information acquiring unit 210 extracts an attribute corresponding to the attribute held by the integration target class from the attribute list to acquire the attribute list of the association destination (association destination attribute list) (step S2005). The association destination attribute list is used for specifying a position where a class corresponding to the integration target class is present or a position where a partial class hierarchy including the integration target class is present in the class hierarchy in the integration-destination ontology.

The associated-class specifying unit 207 then specifies an associated class, which has the common ancestor with the integration target class and the distance from the integration target class via the common ancestor is the shortest, from the associated classes in the integration-source ontology, based on the class mapping information acquired from the class mapping table (step S2006).

Subsequently, the integration-destination-associated-class specifying unit 208 and the position specifying unit 209 specify a class associated with the specified associated class in the integration source, and specify a class corresponding to the integration target class, using the specified associated class in the integration destination as a starting point (step S2007).

The class registering unit 211 registers information in which the integration target class and the class corresponding to the integration target class are associated with each other in the class mapping table, and the attribute registering unit 212 finally registers correspondence information of attributes associated between these classes in the attribute mapping table (step S2008). Thereafter, the class registering unit 211 or the attribute registering unit 212 notifies the display data generator 205 of completion of the integration process.

The display data generator 205 generates the screen information in which the mapping information of the classes and the attributes is updated (step S2009). The generated screen information is output to the client terminal 101. Accordingly, the client terminal 101 can present the latest information to the user. Further, when the information of the integration-source ontology and the integration-destination ontology and the mapping information are stored in the RAM or the like, necessary information is respectively updated at the time of output of the screen information at step S2009.

Figure 20:
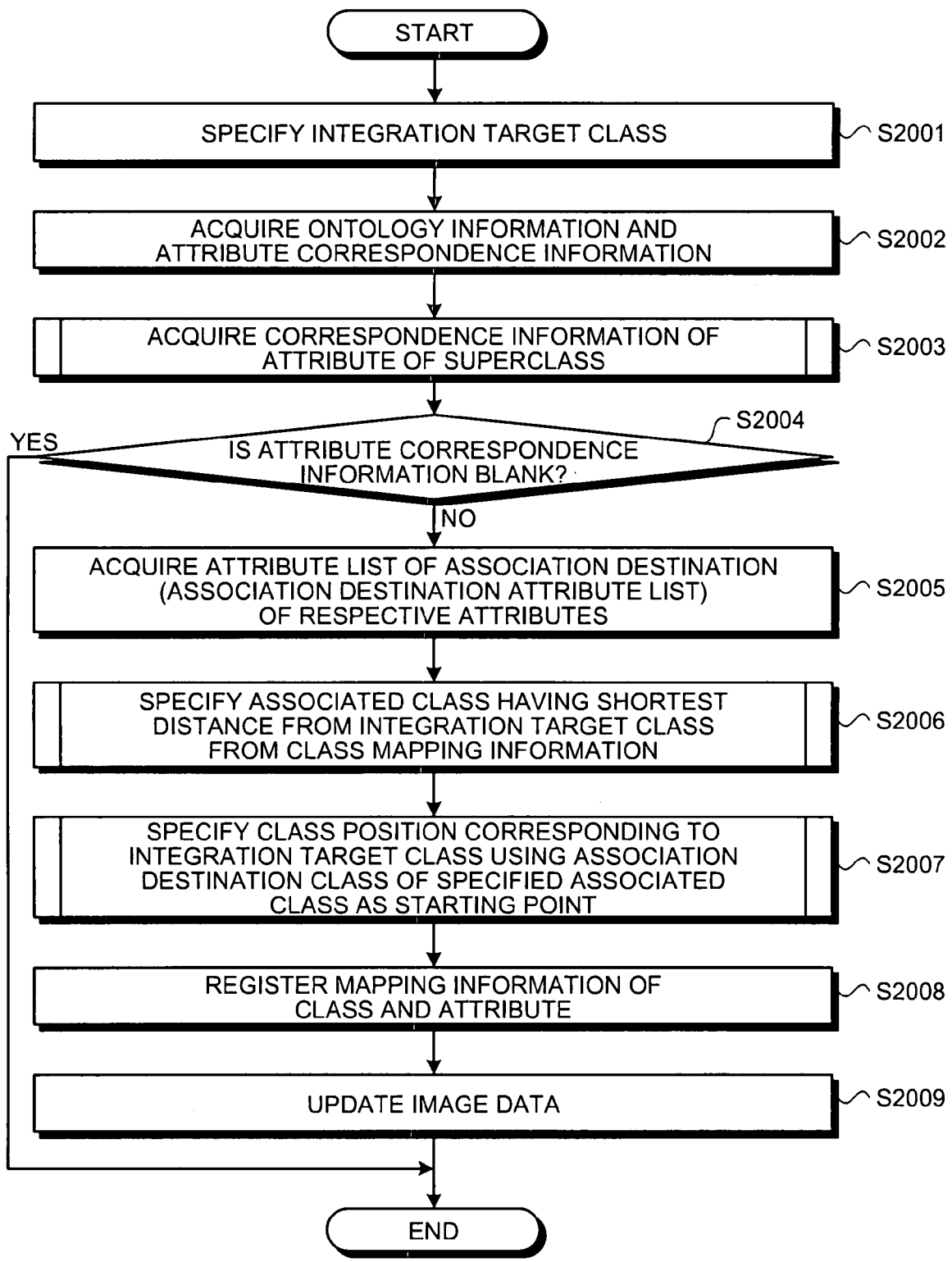
FIG. 20 is a flowchart of a class-associating process procedure performed by the integration support server.
Figure 21:
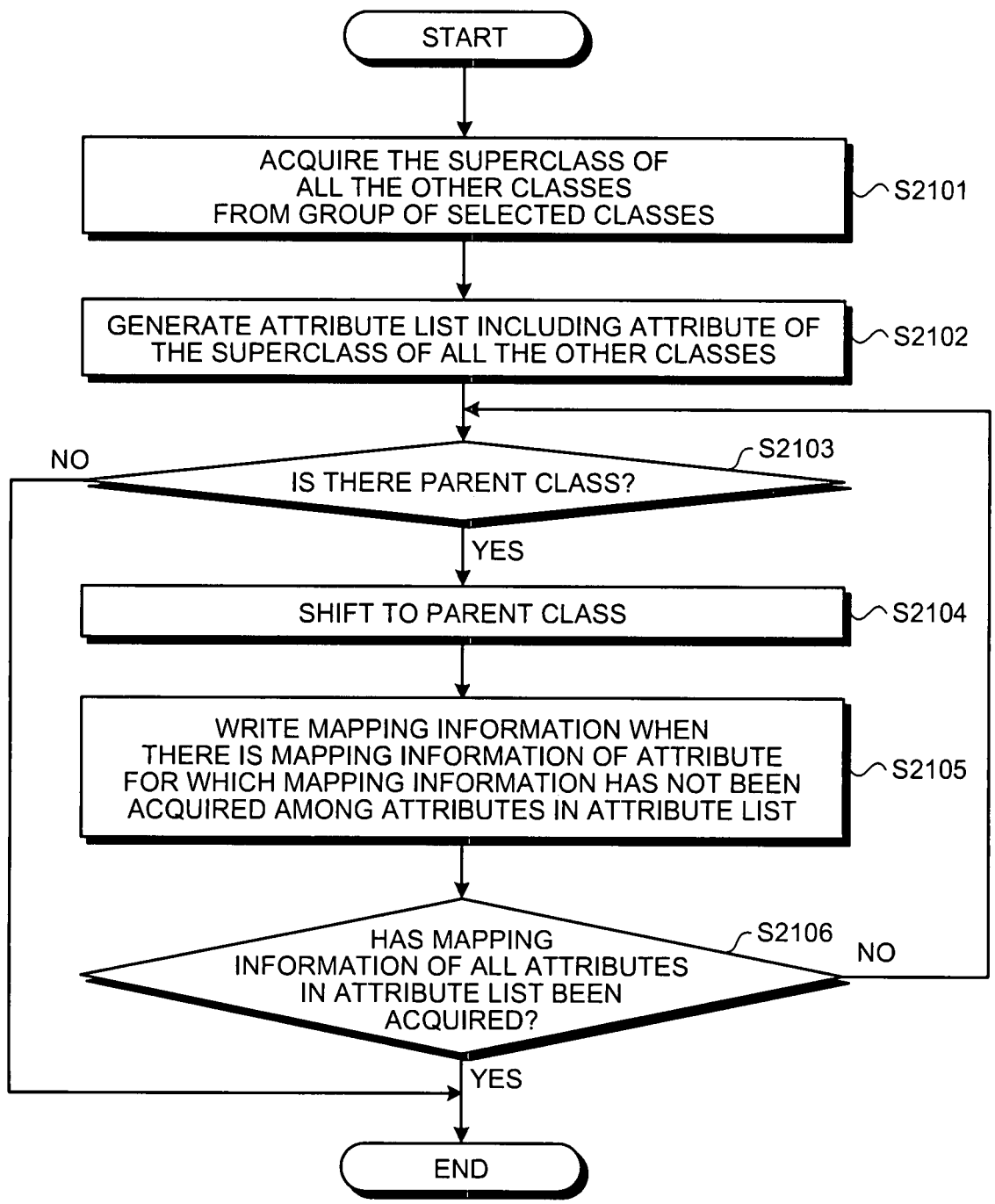
FIG. 21 is a flowchart of a process procedure until an attribute list of the integration target class is acquired at step S2003 in FIG. 20.

A process procedure until the attribute mapping information (attribute list) of the superclass of the integration target class is acquired at step S2003 shown in FIG. 20 is explained next with reference to FIG. 21. The flowchart shows a case where an association of the partial class hierarchy formed of a plurality of classes is requested. The same process can be performed even when the integration target class is only one, and explanations thereof will not be repeated.

The attribute-mapping-information acquiring unit 210 acquires the superclass of all the other classes in the partial class hierarchy as the integration target class (step S2101).

The attribute-mapping-information acquiring unit 210 generates the attribute list in which the attribute held by the integration target class is described (step S2102). The attribute-mapping-information acquiring unit 210 then determines whether there is a parent class for the integration target class (step S2103). When determining that there is no parent class (NO at step S2103), the attribute-mapping-information acquiring unit 210 ends the process.

When determining that there is a parent class for the integration target class (YES at step S2103), the attribute-mapping-information acquiring unit 210 shifts the pointer to the parent class (step S2104). The attribute-mapping-information acquiring unit 210 checks each attribute which is included in the attribute list and for which no mapping information is held, to see if the mapping information for the pertinent attribute is present in the mapping information of the attribute of the parent class indicated by the pointer. When there is such an attribute, the attribute-mapping-information acquiring unit 210 acquires the mapping information and writes the mapping information in the attribute list (step S2105). Accordingly, the attribute of the integration-source ontology and the attribute of the integration-destination ontology are stored in association with each other in the attribute list.

The attribute-mapping-information acquiring unit 210 then determines whether the mapping information of all the attributes in the attribute list has been acquired (step S2106). When determining that the mapping information of all the attributes has been acquired (YES at step S2106), the attribute-mapping-information acquiring unit 210 ends the process.

When determining that there is an attribute for which the mapping information has not been acquired (NO at step S2106), the attribute-mapping-information acquiring unit 210 returns to step S2103 to restart the process by determining whether there is a parent class.

The attribute-mapping-information acquiring unit 210 acquires the mapping information for the attribute of each class, while moving in the class hierarchy from the integration target class to a more generic order one by one. The attribute whose mapping information has already been acquired is excluded from a target of the process at step S2105. Therefore, the method of acquiring the mapping information of respective attributes according to the first embodiment has such a characteristic that the mapping information of the attribute held by an ancestor closer to the integration target class is given priority.

Figure 22:
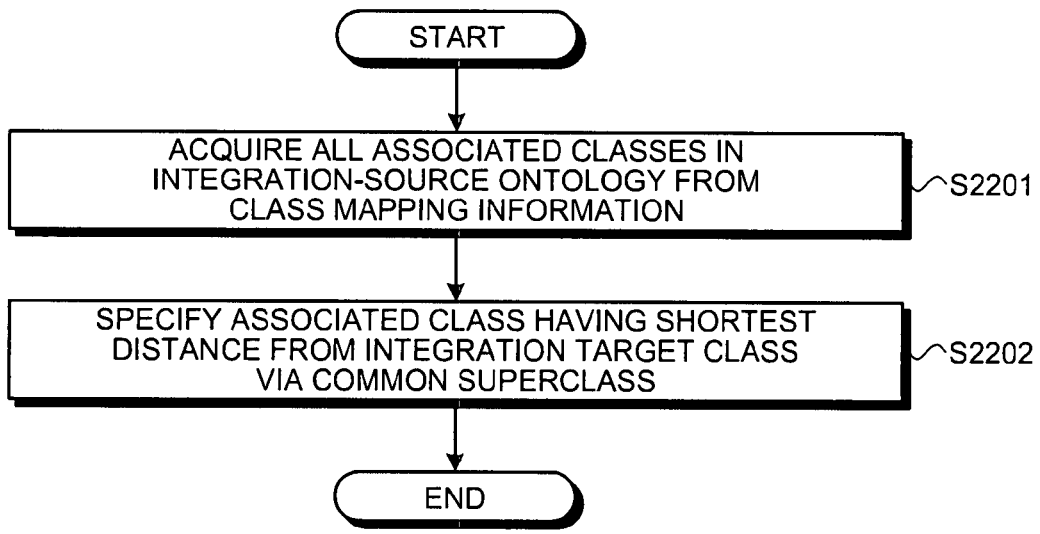
FIG. 22 is a flowchart of a process procedure until an associated class closest to the integration target class is specified from class mapping information shown at step S2006 in FIG. 20.

A process procedure until the associated-class specifying unit 207 specifies an associated class closest to the integration target class from the class mapping information at step S2006 in FIG. 20 is explained next with reference to FIG. 22.

The associated-class specifying unit 207 acquires all the associated classes included in the integration-source ontology from the class mapping information (step S2201).

The associated-class specifying unit 207 then specifies the associated class having a common superclass with the integration target class, and the distance from the integration target class via the common superclass is shortest among the associated classes in the integration source (step S2202).

The distance mentioned at step S2202 stands for a minimum number of branches between the integration target class and the common ancestor of the integration target class and the associated class. For example, in FIG. 15, classes X5 and X7 are classes associated with the classes in the integration-destination ontology Y. The associated-class specifying unit 207 designates class X6 as the integration target class and calculates the minimum distance between integration target class X6 and the common superclass of the integration target class X6 and class X7, thereby obtaining one as the number of branches. It is noted that the common superclass of these classes is X1 and X3, however, the class having the shortest distance from class X6 is selected. Further, when the associated-class specifying unit 207 calculates the minimum distance between the integration target class X6 and the common superclass of the integration target class X6 and class X5, two is obtained as the number of branches. Accordingly, class X7 is specified as the associated class which has the minimum distance.

When determining that there is a plurality of candidates having the minimum distance after the process at step S2202, the associated-class specifying unit 207 can specify one class at random or can specify all the candidates.

Figure 23:
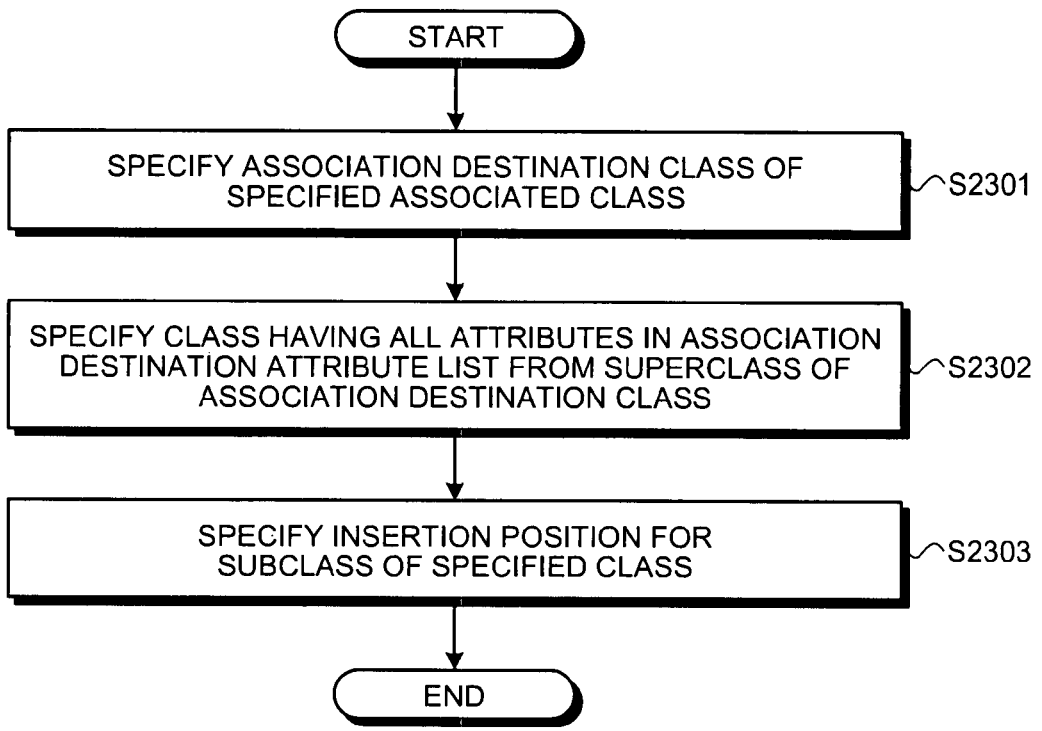
FIG. 23 is a flowchart of a process procedure until a class to be associated with the associated class specified at step S2007 in FIG. 20 is specified and a class corresponding to the integration target class is specified, using the specified class to be associated as a starting point.

A process procedure until the integration-destination-associated-class specifying unit 208 and the position specifying unit 209 specify a class associated with the specified associated class at step S2007 shown in FIG. 20, and specify a class corresponding to the integration target class, using the specified association destination class as a starting point is explained next with reference to FIG. 23.

The integration-destination-associated-class specifying unit 208 acquires the integration-destination-associated class corresponding to the associated class specified at step S2007 from the class mapping information acquired at step S2002 (step S2301).

The position specifying unit 209 then specifies a class having all the attributes included in the association destination attribute list from the superclass of the associated classes in the integration-destination ontology, based on the integration-destination-associated class, class information and attribute information of the integration-destination ontology acquired at step S2002, and the association destination attribute list acquired at step S2005 (step S2302). Therefore, the position specifying unit 209 moves in the class hierarchy from the integration-destination-associated class to a more generic order one by one, and determines whether the class after the move has all the attributes included in the association destination attribute list.

In the search process, a class which is found to satisfy the condition first is specified. That is, the most-specific class among the superclasses satisfying the condition is specified. The specified class is presumed as the common superclass of the class corresponding to the integration target class and the integration-destination-associated class.

The position specifying unit 209 specifies an insertion position of the class corresponding to the integration target class based on the similarity of the attributes, which have not been associated with the attribute of the class in the attribute list, for each subclass lower than the search start position, using the specified class as the search start position (step S2303).

When the class corresponding to the integration target class cannot be detected, the position specifying unit 209 automatically generates a class at a more specific order of the class presumed as the parent class of the class corresponding to the integration target class based on the similarity or the like, and specifies the generated class as the class corresponding to the integration target class.

When determining that there is no unassociated attribute in the association destination class at the time of specifying the class corresponding to the integration target class, the position specifying unit 209 expands the specified class to add the attribute and associates the attributes with each other. These methods are the same as the exiting association method, and explanations thereof will be omitted.

Thus, according to the ontology-integration support system in the first embodiment, at the time of integration of ontologies having a different granularity of attributes, even when the attribute in the integration-source ontology is associated with plural attributes in the integration-destination ontology, the insertion position in the integration-destination ontology can be narrowed down according to the relation with the associated classes in the integration source. Accordingly, in the integration support server 100, association of classes and attributes can be automated, whereby the integration of the ontologies can be facilitated.

The more association between classes and attributes is performed, the more pieces of information are stored in the attribute mapping table and the class mapping table. Accordingly, more pieces of information of the already associated classes and attributes can be used, and the accuracy of the integration process can be improved.

When the ontology size is large, it is difficult to have a thorough knowledge of an entire structure of the ontology. Therefore, in the conventional method, as the size of the integration-destination ontology increases, it becomes difficult to determine which position on the hierarchical structure of the integration-destination ontology each class in the integration-source ontology is to be associated with. In the method shown in the first embodiment, however, classes and attributes having clear correspondence are registered in advance, to accumulate information. As the ontology size increases, the accumulated pieces of information also increase. Accordingly, the association becomes possible through the above-described automatic association process of the classes and the attributes.

While a client server system is assumed in the present embodiment, a stand alone mode without connection to a network can be also applicable to the embodiment.

Figure 24:
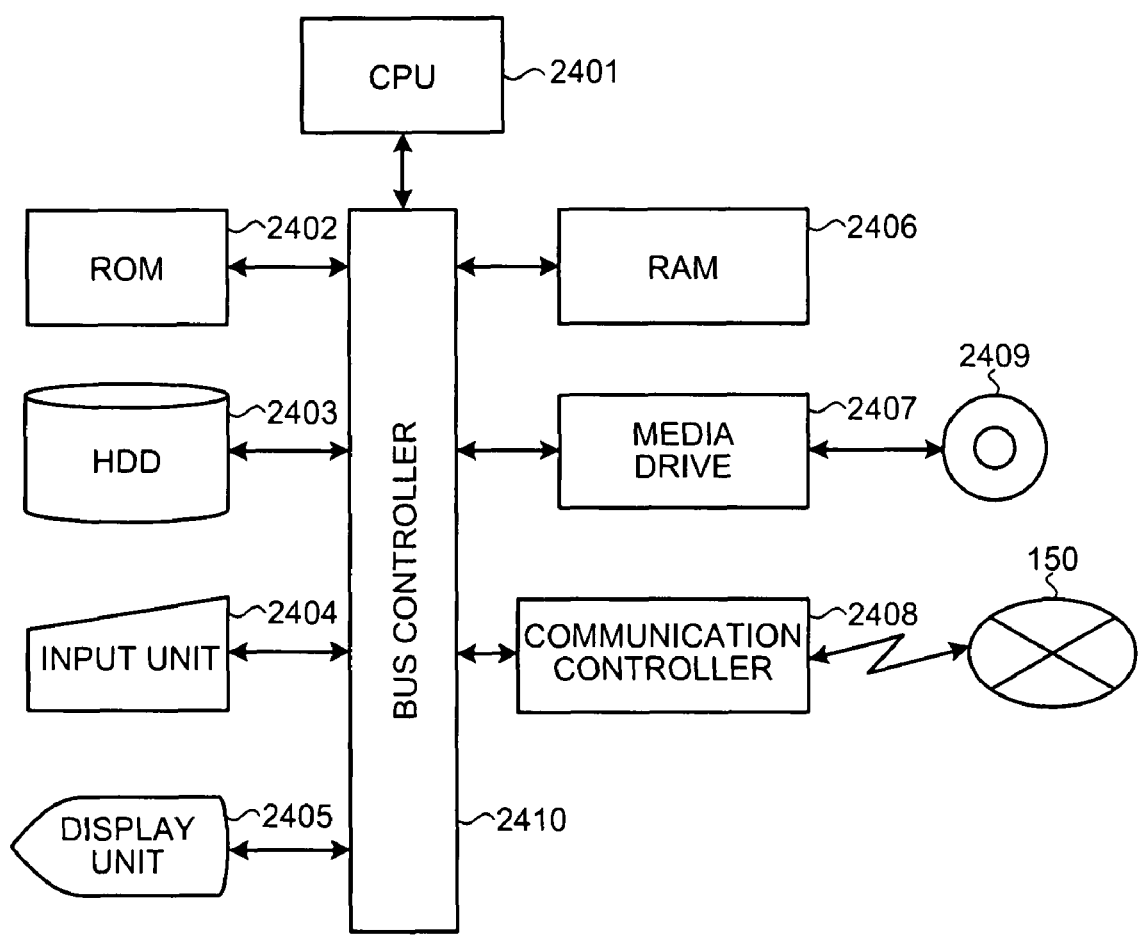
FIG. 24 depicts a hardware configuration of the integration support server and the client terminal.

As shown in FIG. 24, the integration support server 100 and the client terminals 101 and 102 each include a Central Processing Unit (CPU) 2401 that performs information processing, a Read Only Memory (ROM) 2402 that stores BIOS and the like, a Random Access Memory (RAM) 2406 that rewritably stores various data, a Hard Disk Drive (HDD) 2403 that functions as various databases and stores various programs, a media drive 2407 such as a Compact Disk Read Only Memory (CD-ROM) drive that performs reading/writing of information from/to a recording medium 2409, a communication controller 2408 that controls transfer of information to and from other external computers via the network 150, a display unit 2405 such as a Cathode Ray Tube (CRT) or a Liquid Crystal Display (LCD) that displays process progress, result, and the like, an input unit 2404 formed of a keyboard and a pointing device for receiving inputs of a command to the apparatus and information from the user, and a bus controller 2410 that adjusts data transferred between the respective units.

In the integration support server 100 and the client terminals 101 and 102, when the user turns on the client terminal, the CPU 2401 activates a program called loader in the ROM 2402, and reads a program called Operating System (OS) for controlling computer hardware and software from the HDD 2403 into the RAM 2402 to activate the OS.

The OS activates the program, and reads and stores information according to the operation of the user. As a representative OS, Windows®, UNIX®, and the like are well-known. An operation program running on the OS is referred to as an application program. The application program is not limited to the one that operates on the predetermined OS, and can be an application program that allows the OS to take over execution of a part of various processes, or the one included as a part of a group of program files constituting predetermined application software or the OS.

The integration support server 100 stores an ontology integration process program in the HDD 2403 as the application program. In this sense, the HDD 2403 functions as a recording medium that stores the ontology integration process program.

Each of the client terminals 101 and 102 stores an ontology input/output program in the HDD 2403 as the application program. In this sense, the HDD 2403 functions as a recording medium that stores the ontology input/output program.

Generally, the application program installed in the HDD 2403 in the integration support server 100 and the client terminals 101 and 102 is stored in the recording medium 2409, for example, various optical disks such as a CD-ROM and a digital versatile disk (DVD), various magnetic disks such as flexible disk, and various types of media such a semiconductor memory, and the operation program stored in the recording medium 2409 is installed in the HDD 2403. Therefore, the recording medium 2409 having portability such as an optical information recording medium such as a CD-ROM and a magnetic medium such as a floppy disk (FD) can be the recording medium that stores the application program. Further, the application program can be taken in from an external device via, for example, the communication controller 2408 and installed in the HDD 2403.

The ontology integration process program and the ontology input/output program can be stored on the computer connected to the network such as the Internet and provided by downloading via the network. The ontology integration process program and the ontology input/output program of the embodiment can be formed to be provided or distributed via the network such as the Internet.

The ontology integration process program and the ontology input/output program of the embodiment can be incorporated in the ROM and the like beforehand and provided.

In the integration support server 100, when the ontology integration process program operating on the OS is activated, the CPU 2401 executes various types of operation processes according to the ontology integration process program to control the respective units in an integrated manner. On the other hand, in the client terminals 101 and 102, when the ontology input/output program operating on the OS is activated, the CPU 2401 executes various types of operation processes according to the ontology input/output program to control the respective units in the integrated manner.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An ontology-integration-position specifying apparatus comprising:
   a class storage unit that stores class mapping information in which a class included in an integration-source ontology and a class included in an integration-destination ontology are associated with each other, at a time of integrating hierarchical ontologies in which an attribute held by a superclass is inherited by a subclass and an inheritance relation can be specified, the integrating being performed according to the inheritance relation;
   an attribute memory that stores attribute mapping information in which a superclass of an associated class, which is a class in the integration-source ontology and associated in the class mapping information, an attribute held by the superclass of the associated class, and an integration destination attribute which is an attribute of a class in the integration-destination ontology and corresponding to the associated class are associated with each other;
   a class specifying unit that specifies an integration target class, which is an object to be associated with a class included in the integration-destination ontology, from classes other than the associated class and included in the integration-source ontology;
   an attribute-mapping-information acquiring unit that acquires attribute mapping information of an attribute which is held by a superclass of the integration target class and which is associated with the integration destination attribute in the integration-destination ontology, from the stored attribute mapping information;
   an associated class specifying unit that specifies an associated class having a shortest distance from the integration target class via a common superclass with the integration target class, among the associated classes included in the class mapping information;
   an integration-destination-associated-class specifying unit that specifies an integration-destination-associated class included in the integration-destination ontology and associated with the associated class specified from the class mapping information; and
   a position specifying unit that follows the inheritance relation as a route from the integration-destination-associated class specified, and specifies a class in the integration-destination ontology having the integration destination attribute corresponding to the attribute mapping information acquired by the attribute-mapping-information acquiring unit as a position where the class associated with the integration target class is present.

2. The apparatus according to claim 1, further comprising:
   a class registering unit that registers the class present at the position specified by the position specifying unit and the integration target class in association with each other in the class mapping information;
   and an attribute registering unit that registers an attribute of the class present at the position specified by the position specifying unit, when the attribute has not been associated in the attribute mapping information stored, and an attribute of the integration target class, which is not included in the attribute mapping information acquired by the attribute-mapping-information acquiring unit, in association with each other in the attribute mapping information in the attribute storage unit.

3. The apparatus according to claim 1, further comprising:
a display information generator that generates display information including a hierarchical structure of the integration-source ontology and a hierarchical structure of the integration-destination ontology, wherein the class specifying unit specifies a class input as one selected by a user who refers to the display information generated, as the integration target class.

4. The apparatus according to claim 3, wherein the display information generator generates the display information in which the associated class included in the integration-source ontology and the class other than the associated class are made different visually.

5. The apparatus according to claim 1, wherein the position specifying unit moves in a class hierarchy from the integration-destination-associated class specified to a more generic order one by one in the integration-destination ontology, determines whether there is a class having all the integration destination attributes corresponding to the attribute mapping information acquired by the attribute-mapping-information acquiring unit, and determines a class first determined to have all the integration destination attributes as a common superclass of the class associated with the integration target class and the integration-destination- associated class, thereby specifying a subclass of the common superclass as a position where the class associated with the integration target class is present.

6. An ontology-integration supporting method comprising:
specifying an integration target class, which is included in an integration-source ontology and is an object to be associated with a class included in an integration-destination ontology, from classes other than an associated class stored in class mapping information in which a class included in the integration-source ontology and a class included in the integration-destination ontology are associated with each other, at a time of integrating hierarchical ontologies in which an attribute held by a superclass is inherited by a subclass and an inheritance relation can be specified, the integrating being performed according to the inheritance relation;
acquiring attribute mapping information of an attribute held by a superclass of the integration target class and associated with an integration destination attribute in the integration-destination ontology, from attribute mapping information in which the associated class which is a class in the integration-source ontology and associated in the class mapping information, an attribute held by a superclass of the associated class, and the integration destination attribute which is an attribute of a class in the integration-destination ontology and corresponding to the associated class are associated with each other;
specifying an associated class having a shortest distance from the integration target class via a common superclass with the integration target class, among the associated classes included in the class mapping information;
specifying an integration- destination-associated class included in the integration-destination ontology and associated with the associated class specified in the associated class specifying from the class mapping information; and
specifying, by following an inheritance relation as a route from the integration-destination-associated class specified, a class which is in the integration- destination ontology and which has the integration destination attribute corresponding to the attribute mapping information acquired in the attribute-mapping-information acquiring as a position where the class associated with the integration target class is present.

7. A computer program product having a computer readable storage medium including a plurality of instructions for integrating hierarchical ontologies in which an attribute of a superclass is inherited by a subclass and an inheritance relation can be specified, the integrating being performed according to the inheritance relation, wherein the instructions, when executed by a computer, cause the computer to perform steps comprising:
specifying an integration target class, which is included in an integration-source ontology and is an object to be associated with a class included in an integration-destination ontology, from classes other than an associated class stored in class mapping information in which a class included in the integration-source ontology and a class included in the integration-destination ontology are associated with each other;
acquiring attribute mapping information of an attribute held by a superclass of the integration target class and associated with an integration destination attribute in the integration-destination ontology, from attribute mapping information in which the associated class which is a class in the integration-source ontology and associated in the class mapping information, an attribute held by a superclass of the associated class, and the integration destination attribute which is an attribute of a class in the integration-destination ontology and corresponding to the associated class are associated with each other;
specifying an associated class having a shortest distance from the integration target class via a common superclass with the integration target class, among the associated classes included in the class mapping information;
specifying an integration-destination-associated class included in the integration-destination ontology and associated with the associated class specified in the associated class specifying from the class mapping information; and
specifying, by following an inheritance relation as a route from the integration-destination-associated class specified, a class which is in the integration-destination ontology and which has the integration destination attribute corresponding to the attribute mapping information acquired in the attribute-mapping-information acquiring as a position where the class associated with the integration target class is present.

8. The apparatus according to claim 2, wherein the attribute registering unit registers the associated class of the integration source and the superclass of the associated class of the integration source.

* * * * *